(12) United States Patent
Sumomozawa et al.

(10) Patent No.: US 7,971,435 B2
(45) Date of Patent: Jul. 5, 2011

(54) HYRDAULIC TRANSMISSION

(75) Inventors: Hironori Sumomozawa, Amagasaki (JP); Shigenori Sakikawa, Amagasaki (JP); Ryota Ohashi, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 273 days.

(21) Appl. No.: 11/735,398

(22) Filed: Apr. 13, 2007

(65) Prior Publication Data

US 2007/0204609 A1    Sep. 6, 2007

Related U.S. Application Data

(63) Continuation-in-part of application No. 11/392,871, filed on Mar. 30, 2006, now Pat. No. 7,331,177, which is a continuation-in-part of application No. 10/804,134, filed on Mar. 19, 2004, now Pat. No. 7,028,471, which is a continuation of application No. 10/310,917, filed on Dec. 6, 2002, now abandoned, which is a continuation of application No. 09/695,661, filed on Oct. 24, 2000, now Pat. No. 6,508,059.

(30) Foreign Application Priority Data

Oct. 26, 1999   (JP) ..................... 11-304444

(51) Int. Cl.
*F16D 31/02*   (2006.01)
(52) U.S. Cl. ............................ 60/464; 60/468; 60/489
(58) Field of Classification Search .............. 60/464, 60/468, 489
See application file for complete search history.

(56) References Cited

U.S. PATENT DOCUMENTS

| | | |
|---|---|---|
| 3,704,588 A | 12/1972 | Trabbic |
| 4,986,073 A | 1/1991 | Okada |
| 5,136,845 A | 8/1992 | Woodley |
| 5,356,347 A | 10/1994 | Komura et al. |
| 5,546,752 A | 8/1996 | Horton et al. |
| 5,836,159 A | 11/1998 | Shimizu et al. |
| 6,508,059 B1 | 1/2003 | Takada et al. |
| 6,966,181 B2 | 11/2005 | Ohashi et al. |

*Primary Examiner* — F. Daniel Lopez
(74) *Attorney, Agent, or Firm* — Sterne, Kessler, Goldstein & Fox, P.L.L.C.

(57) ABSTRACT

A hydraulic transmission comprises a hydraulic pump and a hydraulic motor, which are mounted onto a center section to be fluidly connected to each other through a closed fluid circuit formed in the center section. A neutral valve is connected to the closed fluid circuit. The neutral valve is fitted into an outward opened end of a vertical slanted oil hole of the closed fluid circuit. Alternatively, the neutral valve is fitted into an outward opened end of a straight oil hole having an opposite outward opened end into which a charge check valve is fitted.

8 Claims, 18 Drawing Sheets

HYRDAULIC TRANSMISSION

CROSS REFERENCE TO RELATED APPLICATION

This application is a Continuation-in-Part of application Ser. No. 11/392,871, filed Mar. 30, 2006, which is a Continuation-in-Part of application Ser. No. 10/804,134, filed Mar. 19, 2004, which is a Continuation of U.S. application Ser. No. 10/310,917, filed Dec. 6, 2002, now abandoned, which is a Continuation of U.S. application Ser. No. 09/695,661, filed Oct. 24, 2000, now U.S. Pat. No. 6,508,059, the entire disclosures of which are incorporated herein by reference.

BACKGROUND OF THE INVENTION

1. Field of the Invention

The present invention relates to a hydrostatic transmission (hereinafter, "HST").

To be detailed, it relates to a technique for preventing a hydraulic circuit of the HST from overheating.

2. Related Art

Conventionally, there is a well-known HST having its neutral position expanded.

For example, there is a conventional transaxle apparatus equipped with a power transmission system including a conventional HST 8 for enabling a vehicle to travel forwardly and backwardly, as shown in FIG. 1. HST 8 comprises a variable displacement hydraulic pump 11 including a movable swash plate 13 and a fixed displacement hydraulic motor 21. Hydraulic pump 11 and motor 21 are fluidly connected with each other through a closed circuit comprising a first oil passage 93 and a second oil passage 94. Second oil passage 94 is hydraulically pressurized higher than first oil passage 93 during backward traveling. A charge oil passage 82 is provided for supplying the closed circuit with oil. Between charge oil passage 82 and each of first and second oil passages 93 and 94 is interposed a check valve 83. Check valve 83 provided for second oil passage 94 is bypassed by a drain oil passage including an orifice 116. Even if hydraulic pump 11 is inaccurately located in neutral, that is, swash plate 13 is slightly moved from its proper neutral position into its backward traveling range, increased pressure oil is drained from second oil passage 94 through orifice 116 so as to keep the hydraulic pressure in second oil passage 94 at its neutral level, thereby preventing a vehicle from jerking caused by unexpected driving of hydraulic motor 21.

Thus, movable swash plate 13 is provided in its movable range with a dead zone expanded from its proper neutral position into its backward traveling range for keeping hydraulic motor 21 neutral. For attaching the transaxle apparatus having HST 8 shown in FIG. 1 onto a vehicle, swash plate 13 is only required for sufficiently interlocking with a manual speed control tool such as a lever or a pedal to be positioned within the dead zone while the speed control tool is set at its neutral position, thereby easing an adjustment job before the releasing of the vehicle equipped with the transaxle apparatus.

However, actually, the operating oil drained from second oil passage 94 through the drain oil passage is not returned directly into an oil sump 9 but is returned into charge oil passage 82. Hence, the heated oil drained from second oil passage 94 is absorbed through check valve 83 into hydraulically depressed first oil passage 93 while being insufficiently cooled, thereby increasing the temperature of operating oil circulated between first and second oil passages 93 and 94 and reducing the displacement efficiency of HST 8.

SUMMARY OF THE INVENTION

In a first aspect of the invention, a hydraulic transmission comprises: a housing; a hydraulic pump; a hydraulic motor; a center section; and a neutral valve. An interior space of the housing serves as an oil sump. The hydraulic pump, the hydraulic motor and the center section are disposed in the housing. The hydraulic pump and the hydraulic motor are mounted onto the center section. A closed fluid circuit is formed in the center section so as to fluidly connect the hydraulic pump to the hydraulic motor. The closed fluid circuit includes a vertically slanted oil hole having an outward opened end. The neutral valve is fitted into the opened end of the vertically slanted oil hole. Preferably, the neutral valve is a continuous flow escape valve.

Alternatively, in a second aspect of the invention, a hydraulic transmission comprises: a housing; a hydraulic pump; a hydraulic motor; a center section; a pair of charge check valves and a neutral valve. An interior space of the housing serves as an oil sump. The hydraulic pump, the hydraulic motor and the center section are disposed in the housing. The hydraulic pump and the hydraulic motor are mounted onto the center section. First and second kidney ports are formed in the center section and opened to the hydraulic pump. Third and fourth kidney ports are formed in the center section and opened to the hydraulic motor. A first fluid passage is formed in the center section, and interposed between the first and third kidney ports. The first fluid passage has opposite ends opened outward from the center section. A second fluid passage is formed in the center section, and interposed between the second and fourth kidney ports. The second fluid passage has opposite ends opened outward from the center section. Each of the charge check valves is fitted into one opened end of each of the first and second fluid passages. The neutral valve is fitted into the other opened end of at least one of the first and second fluid passages. Preferably, the neutral valve is a continuous flow escape valve.

In a third aspect of the invention, a hydrostatic transaxle comprises: a housing; a hydraulic pump; a hydraulic motor; and a center section. The interior space of the housing serves as an oil sump. The hydraulic pump is disposed in the oil sump. A hydraulic motor is disposed in the oil sump. The center section is disposed in the oil sump. The hydraulic pump and the hydraulic motor are mounted onto the center section. A closed fluid circuit formed in the center section so as to fluidly connect the hydraulic pump to the hydraulic motor. A continuous flow escape valve, serving as a neutral valve, is fluidly connected between the closed fluid circuit and the oil sump.

Due to the first, second or third aspect of the invention, the hydraulic transmission or hydrostatic transaxle is provide with an expanded neutral zone for preventing a stationary vehicle employing the hydraulic transmission or hydrostatic transaxle from jerking, and preventing shock when the vehicle starts.

Other and further objects, features and advantages of the invention will appear more fully from the following description.

DETAILED DESCRIPTION OF THE INVENTION

Figure 1:
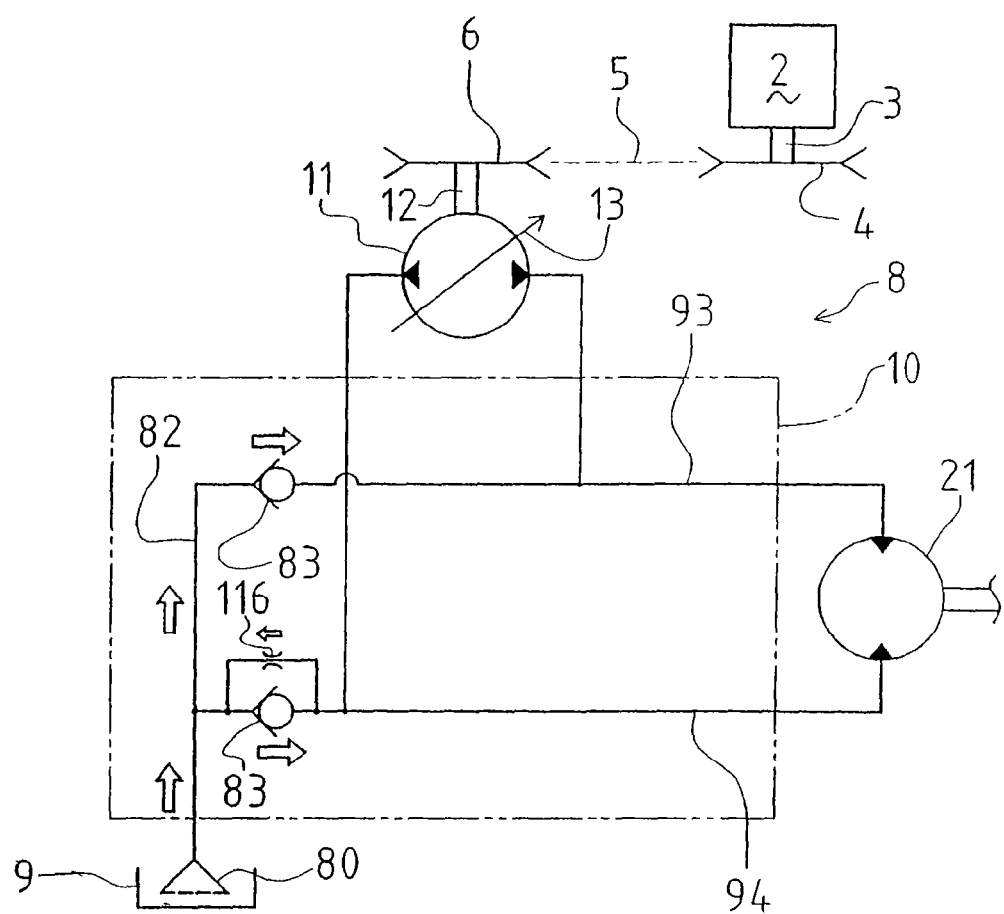
FIG. 1 is a hydraulic circuit diagram of an HST provided with a conventional oil draining system for expanding a neutral zone of the HST.

Firstly, description will be given on an entire construction of a transaxle apparatus employing an HST as an embodiment of the present invention shown in FIGS. 2 through 5.

A transaxle apparatus 1 is provided with a housing 9 consisting of an upper housing part 9t and a lower housing part 9b joined with each other though a horizontal joint surface. A bearing portion for a motor shaft 22 as discussed below is provided on the joint surface between upper and lower housing parts 9t and 9b. A bearing portion for rotatably supporting axles 50L and 50R is disposed in upper housing part 9t above the joint surface. Inner ends of axles 50L and 50R are differentially connected with each other through a differential gear unit 40 in housing 9. Axles 50L and 50R project laterally from left and right sides of housing 9.

An interior space of housing 9 is divided into a first chamber R1 and a second chamber R2 by a partition wall 9i integrally made of housing 9. In first chamber R1 is disposed an HST 8. In second chamber R2 are disposed a drive train 30 including gears for transmitting power from motor shaft 22 to differential gear unit 40, differential gear unit 40 and axles 50L and 50R.

Partition wall 9i, in a horizontal way, comprises a lateral portion in parallel to axles 50L and 50R and a longitudinal portion extended perpendicularly to the lateral portion. Both portions are continuously extended from each other, so as to make first chamber R1 adjacent to second chamber R2. In a vertical way, partition wall 9i is made by two wall portions of upper and lower housing parts 9t and 9b, that is, one extended downwardly from the inside surface of the roof wall of upper housing part 9t to the above-mentioned joint surface, and the other extended upwardly from the inside surface of the bottom wall of lower housing part 9b to the joint surface. When upper and lower housing parts 9t and 9b are joined together, the wall portions are jointed with each other at their ends, so as to form partition wall 9i which divides the interior of housing 9 into first and second chambers R1 and R2.

Figure 4:
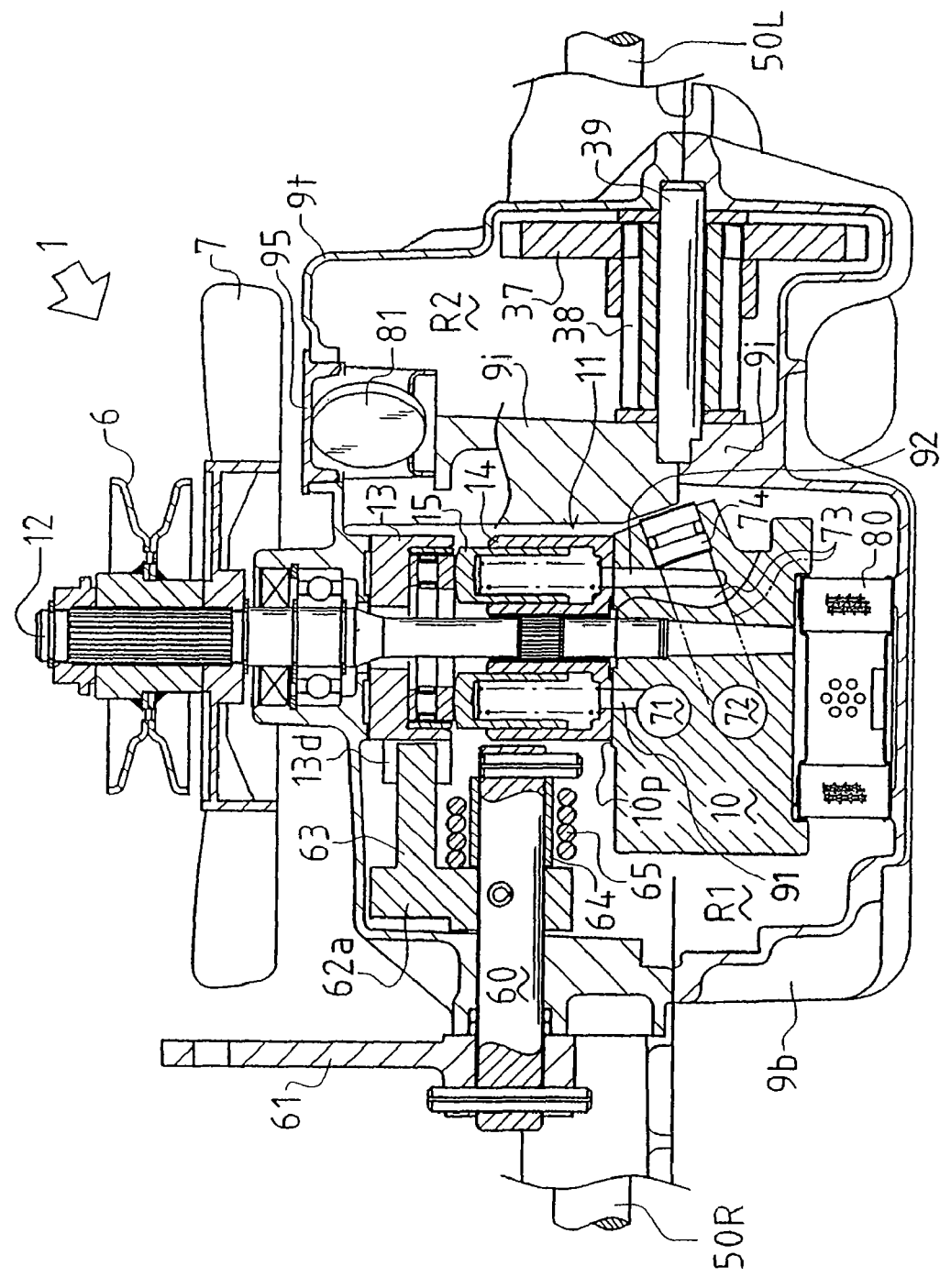
FIG. 4 is a sectional view taken along lines IV-IV of FIG. 3.

Both first and second chambers R1 and R2 are filled with common oil, thereby serving as oil sumps. As shown in FIG. 4, on the roof wall of housing 9 is provided an oiling cap 95, which is removed when oil is to be poured into housing 9.

First and second chambers R1 and R2 communicate with each other through an oil filter 81 disposed in an optional portion of partition wall 9i, so that oil in second chamber R2, which involves obstacles such as iron particles generated from the gears rubbing against one another, is introduced into first chamber R1 through oil filter 81 while being filtered, thereby preventing HST 8 in first chamber R1 from an adverse effect by the obstacles. As a result, oil in housing 9 can be used for both operation of HST 8 in first chamber R1 and lubrication of gears and bearings in second chamber R2 (and first chamber R1).

On the top wall of upper housing part 9t corresponding to first chamber R1 is provided an oil circulation port (not shown), which is connected with an external oil reservoir (not shown) through piping such as a rubber hose. Therefore, even if the oil in first chamber R1 is heated so as to increase in volume by driving of HST 8, the excessive oil is made to flow into the external reservoir, thereby regulating the volume of oil in housing 9.

First chamber R1 occupies an internal area of housing 9 in front of axle 50R and on a lateral side of drive train 30. In first chamber R1 is detachably disposed a center section 10 of HST 8. An elongated portion of center section 10 is oriented in perpendicular to axles 50L and 50R. Center section 10 is provided at the front portion thereof with a vertical surface serving as a motor mounting surface 10m, onto which a hydraulic motor 21 is mounted. Center section 10 is provided at the rear portion thereof with a horizontal surface serving as a pump mounting surface 10p, onto which a hydraulic pump 11 is mounted. A pump shaft 12 is centered in pump mounting surface 10p so as to be vertically supported by center section 10.

For details about hydraulic pump 11, a cylinder block 14 is slidably rotatably put on pump mounting surface 10p of center section 10. Cylinder block 14 is provided therein with a plurality of cylinders, into each of which a piston 15 is reciprocally movably inserted through a biasing spring.

Figure 2:
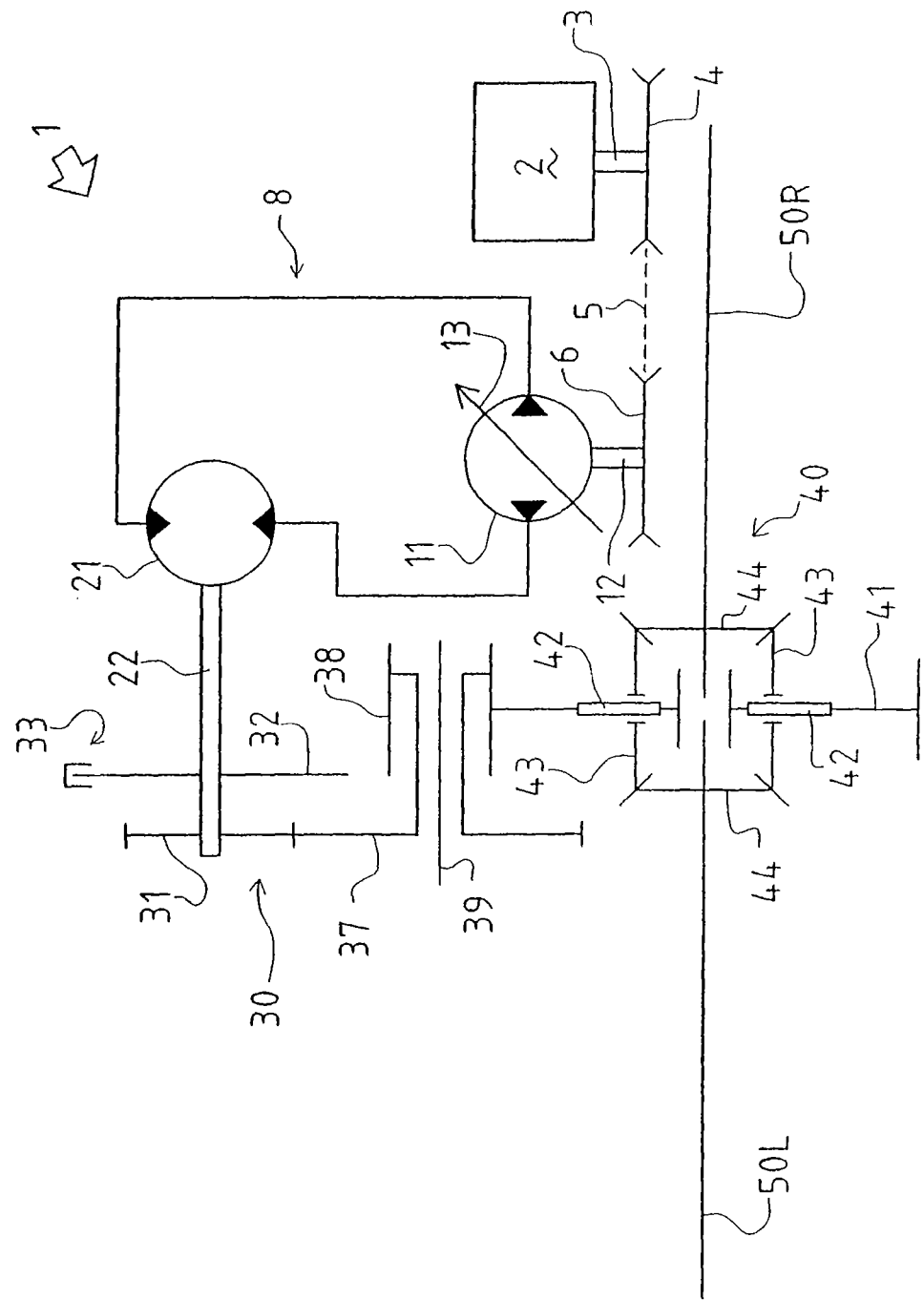
FIG. 2 is a diagram of a transaxle apparatus to which the present invention is to be applied.

Heads of pistons 15 abut against movable swash plate 13. Pump shaft 12, also serving as an input shaft, is disposed along the rotary axis of cylinder block 14 so as not to be rotatable relative to cylinder block 14. Pump shaft 12 projects upwardly from the top of upper housing part 9t. A cooling fan 7 and an input pulley 6 are fixed onto the projecting portion of pump shaft 12. As shown in FIG. 2, rotary power of an output shaft 3 of an engine 2 on a vehicle is transmitted into input pulley 6 through an output pulley 4 and a belt 5.

Movable swash plate 13 is moved so as to slant the surface thereof abutting against pistons 15 at an optional angle from a horizontal surface in perpendicular to the rotary axis of cylinder block 14, thereby changing the direction and amount of oil discharged from hydraulic pump 11.

For slanting swash plate 13, as shown in FIGS. 2 and 4, a control shaft 60 is rotatably supported in parallel to axles 50L and 50R by a side wall of upper housing part 9t disposed oppositely to drive train 30 for transmitting power to differential gear unit 40. A basic end of a control arm 61 is fixed onto a portion of control shaft 60 outwardly projecting from the side wall of upper housing part 9t. A swing arm 62 is attached onto control shaft 60 in housing 9. Control arm 61 interlocks with a manual speed control tool (not shown) such as a lever or a pedal installed adjacently to a seat on the vehicle.

Swing arm 62 comprises a first arm 62a and a second arm 62b both extending radially from control shaft 60. As shown in FIG. 4, an utmost end of first arm 62a is formed into a projection 63, which is engaged into a groove 13d provided on a side surface of movable swash plate 13. A phantom center line around which swash plate 13 swings coincides with an axis of control shaft 60, so that, even if swash plate 13 is slanted to any angle, the engagement between projection 63 and groove 13d is certainly kept.

When control arm 61 is rotated in the longitudinal direction relative to the vehicle, swing arm 62 is rotated forward or backward around control shaft 60, so as to slant movable swash plate 13 through first arm 62a, thereby changing the output force of hydraulic pump 11.

An engaging pin 67 projects from the utmost end of second arm 62b. In housing 9 is disposed a bush 64 around control shaft 60. A neutral spring 65 of a twisted coil type is wound around bush 64. Both end portions of neutral spring 65 cross each other so as to extend toward second arm 62b. An eccentric shaft 66 attached to the inside wall of upper housing part 9t and engaging pin 67 are sandwiched between the both ends of neutral spring 65.

When control arm 61 is rotated for speed changing operation, one end of neutral spring 65 is outwardly pushed by rotated engaging pin 67 while the other end thereof is stopped by eccentric shaft 66, thereby biasing control arm 61 toward its neutral position. Then, if control arm 61 is released from the operation force, neutral spring 65 returns to its initial state so that engaging pin 67 is forcibly returned to its neutral position demarcated by eccentric shaft 66 and held there.

Eccentric shaft 66 projects outwardly from housing 9 so as to serve as an adjusting screw. Eccentric shaft 66 is optionally rotated at its adjusting screw portion so as to change in position, thereby accurately adjusting movable swash plate 13 to its neutral position.

Pressure oil discharged from hydraulic pump 11 is sent to hydraulic motor 21 through a closed fluid circuit in center section 10, thereby constituting HST 8. The closed fluid circuit of HST 8 will be detailed later according to FIGS. 6 and 7.

Figure 3:
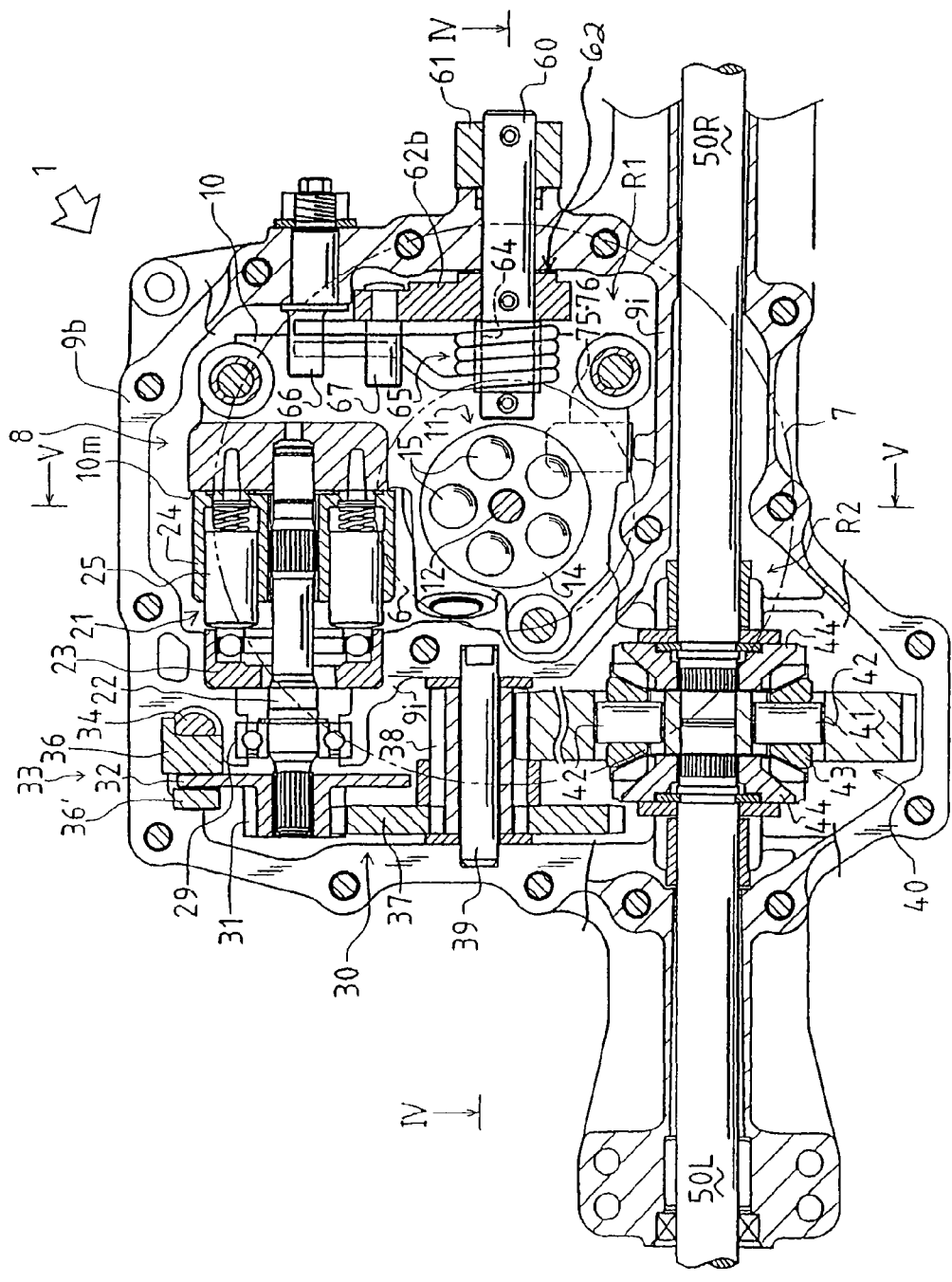
FIG. 3 is a plan view of the transaxle apparatus employing the present invention from which an upper housing part 9t is removed, partly including a sectional view of upper housing part 9t.

Referring to the construction of hydraulic motor 21, as shown in FIG. 3, a cylinder block 24 is slidably rotatably mounted onto vertical motor mounting surface 10m of center section 10, so that a rotary axis of cylinder block 24 is oriented laterally horizontally. In cylinder block 24 is bored a plurality of cylinders, into each of which a piston 25 is reciprocally movably inserted through a biasing spring.

Heads of pistons 25 abut against a fixed swash plate 23 fixedly sandwiched between upper and lower housing parts 9t and 9b. Motor shaft 22 is laterally horizontally disposed along the rotary axis of cylinder block 24 in parallel to axles 50L and 50R so as not to be rotatable relative to cylinder block 24.

One end of motor shaft 22 is supported in a bearing hole opening at the center of motor mounting surface 10m of center section 10. The other end of motor shaft 22 is inserted into second chamber R2 through a bearing 29 on the joint surface of partition wall 9i. Bearing 29 is provided with a seal for prevention of fluid communication between both chambers R1 and R2 therethrough.

Description will now be given on drive train 30 for transmitting power from motor shaft 22 into differential gear unit 40.

An output gear 31 and a brake disk 32, which are integrally formed by a common member, are fixed onto motor shaft 22 in second chamber R2. A brake device 33 for applying force on brake disk 32 is disposed adjacent to brake disk 32 so as to brake motor shaft 22.

As shown in FIG. 3, brake device 33 comprises brake pads 36 and 36', a brake control shaft 34 and a brake arm 35. Brake pads 36 and 36' are disposed adjacent to brake disk 32. Brake control shaft 34 is formed into a sectionally D-like shaped cam for pushing brake pad 36 against brake disk 32. Brake control shaft 34 is vertically supported by the roof wall of upper housing part 9t. A top end of brake control shaft 34 projects upwardly from housing 9 so as to be fixedly provided thereon with brake arm 35.

When brake arm 35 is rotationally operated, brake control shaft 34 is rotated integrally with brake arm 35 so that its cam presses brake pad 36 against brake disk 32, thereby generating frictional force to brake motor shaft 22.

A counter shaft 39 is horizontally supported behind motor shaft 22 in parallel. A diametrically small gear 38 is freely provided on counter shaft 39. A diametrically large gear 37, which is provided along its inner periphery with teeth coinciding with teeth of gear 38, is pierced by gear 38 through the inner peripheral teeth so that gears 37 and 38 are not rotatable relative to each other. Gear 37 engages with output gear 31 fixed on motor shaft 22.

A ring gear 41 of differential gear unit 40 constantly engages with gear 38.

Referring to the construction of differential gear unit 40 as shown in FIG. 3, in ring gear 41 are disposed a pair of pinion shafts 42 in perpendicular to axles 50L and 50R, so that pinion shafts 42 are rotated integrally with ring gear 41. A pair of pinions 43 as bevel gears are rotatably provided on respective pinion shafts 42. A pair of differential side gears 44 are fixed onto respective inner ends of axles 50L and 50R, so as to engage with respective pinions 43. Accordingly, the power input into ring gear 41 is shared by axles 50L and 50R through pinions 43 and differential side gears 44.

Next, description will be given on the closed hydraulic circuit formed in center section 10 of HST 8.

Center section 10 comprises a first side end 10a and a second side end 10b opposite to each other. A pair of parallel first horizontal oil hole 71 and second horizontal oil hole 72 are straightly bored into center section 10 from a surface of first side end 10a toward the opposite surface of second side end 10b along the longitudinal direction of center section 10. First and second horizontal oil holes 71 and 72 are juxtaposed in a vertical row so that first horizontal oil hole 71 is disposed above second horizontal oil hole 72. The open ends of first and second horizontal oil holes 71 and 72, which are open at the first side surface of center section 10, are plugged by plugs 75 and 76, respectively. The other ends of first and second horizontal oil holes 71 and 72 in vicinity of the second side surface are closed within center section 10. A slant oil hole 73 is branched from an intermediate portion of second horizontal oil hole 72. An open end of oil hole 73 is plugged by a plug 74.

Each of pump and motor mounting surfaces 10*p* and 10*m* of center section 10 is provided with a pair of first and second kidney ports 91 and 92. Both first kidney ports 91 of pump and motor mounting surfaces 10*p* and 10*m* are joined to first oil hole 71. Thus, both first kidney ports 91 are connected with each other through first oil hole 71, thereby constituting a first oil passage 93. Second kidney port 92 of pump mounting surface 10*p* is joined to slant oil hole 73. Second kidney port 92 of motor mounting surface 10*m* is joined to second horizontal oil hole 72. Both second kidney ports 92 are connected with each other through second horizontal oil hole 72 and slant oil hole 73, thereby constituting a second oil passage 94. Hydraulic pump 11 and hydraulic motor 21 are fluidly connected with each other through a closed circuit comprising first and second oil passages 93 and 94.

Figure 5:
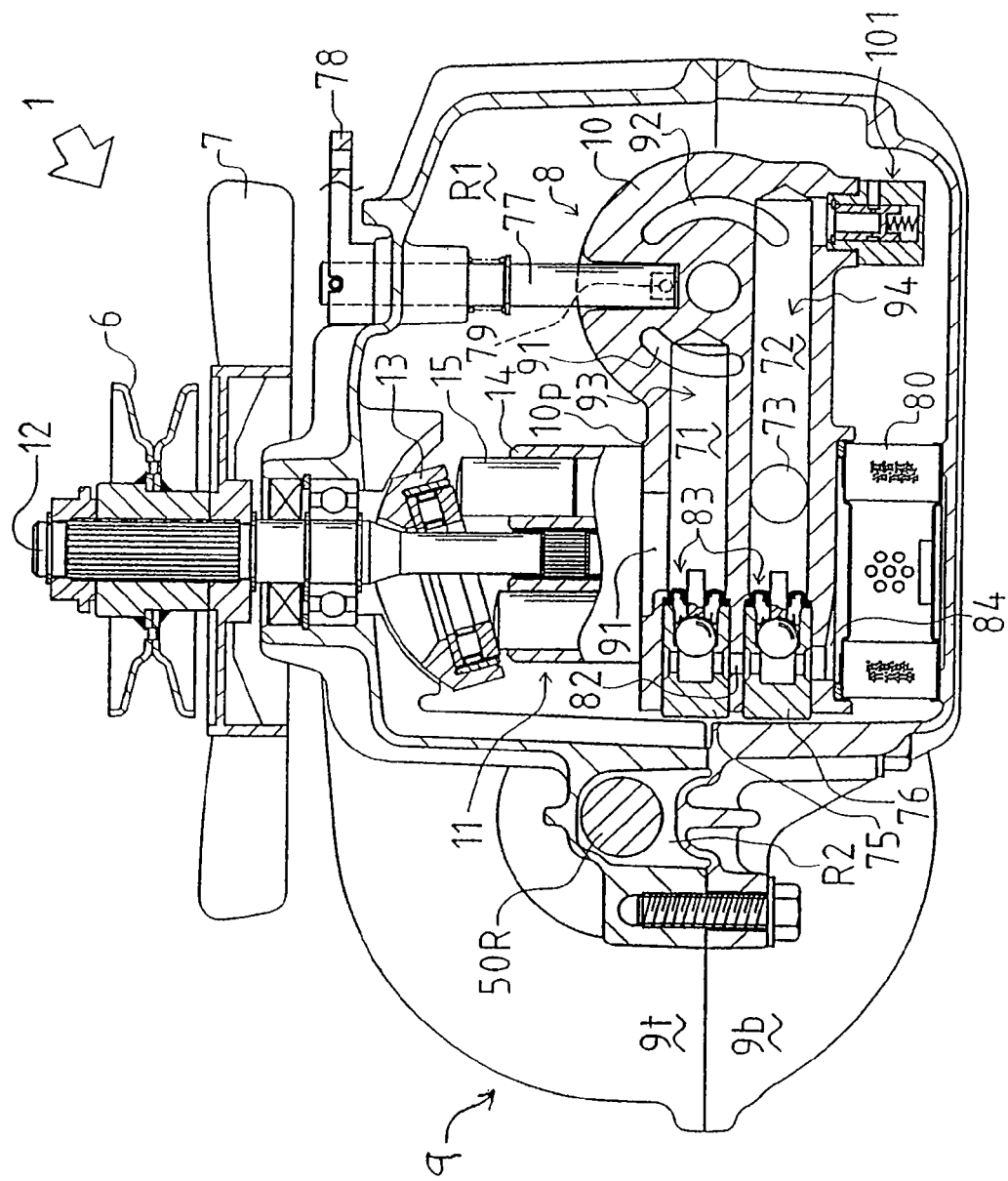
FIG. 5 is a sectional view taken along lines V-V of FIG. 3.

A vertical hole is bored through center section 10 adjacent to the surface of first side end 10*a* together with plugs 75 and 76, thereby providing a charge oil passage 82. A pair of check valves 83 are disposed in respective plugs 75 and 76, so that one of check valves 83 is interposed between first horizontal oil hole 71 and charge oil passage 82, and the other between second horizontal oil hole 72 and charge oil passage 82. Check valves 83 are opened by hydraulic depression of respective oil passages 93 and 94 so as to allow oil in charge oil passage 82 to flow into respective oil passages 93 and 94 and prevent the oil flowing from respective oil passages 93 and 94 into charge oil passage 82. A bottom open end of charge oil passage 82 serves as a charge oil inlet 84, which is covered with a first oil filter 80 as shown in FIGS. 4 and 5.

When the manual speed control tool is operated for forward traveling, hydraulic pump 11 acts so as to hydraulically pressurize first oil passage 93 and relatively hydraulically depress second oil passage 94, thereby driving hydraulic motor 21 in a forward traveling mode. When the manual speed control tool is operated for backward traveling, hydraulic pump 11 acts so as to hydraulically pressurize second oil passage 94 and relatively hydraulically depress first oil passage 93, thereby driving hydraulic motor 21 in a backward traveling mode. During these actions of hydraulic pump 11, oil is absorbed through charge oil inlet 84 into charge oil passage 82 while being filtered by first oil filter 80, and is introduced into hydraulically depressed one of first and second oil passages 93 and 94 through corresponding check valve 83, thereby compensating the oil leak from the closed fluid circuit of HST 8.

The closed fluid circuit of HST 8 is provided with an oil draining device, which releases oil in second oil passage 94 for expanding the neutral zone of hydraulic pump 11, in other words, for keeping HST 8 neutral while movable swash plate 13 is slightly slipped from its proper neutral position into its backward traveling range. Description will now be given on some embodiments of center section 10 to which an oil draining device is fitted for expanding the neutral zone of HST 8.

Referring to FIGS. 5, 6 and 8-10, center section 10 is provided with a vertical drain port 111 joined to a closed end portion of second horizontal oil hole 72, which is disposed adjacent to second side end 10*b*.

Referring to each of FIGS. 5, 6 and 8-10, each of various oil draining devices 101-104 is mounted onto the bottom of center section 10 adjacent to second side end 10*b* of center section 10 so as to cover the bottom opening of drain port 111. As mentioned above, charge oil inlet 84 also disposed on the bottom of center section 10 is adjacent to first side end 10*a*. Therefore, the oil draining device is disposed oppositely to charge oil inlet 84 with respect to center section 10 or second oil hole 72. As a result, the oil draining device is sufficiently spaced from charge oil inlet 84 so as to be prevented from the adverse effect of oil charging.

Figure 6:
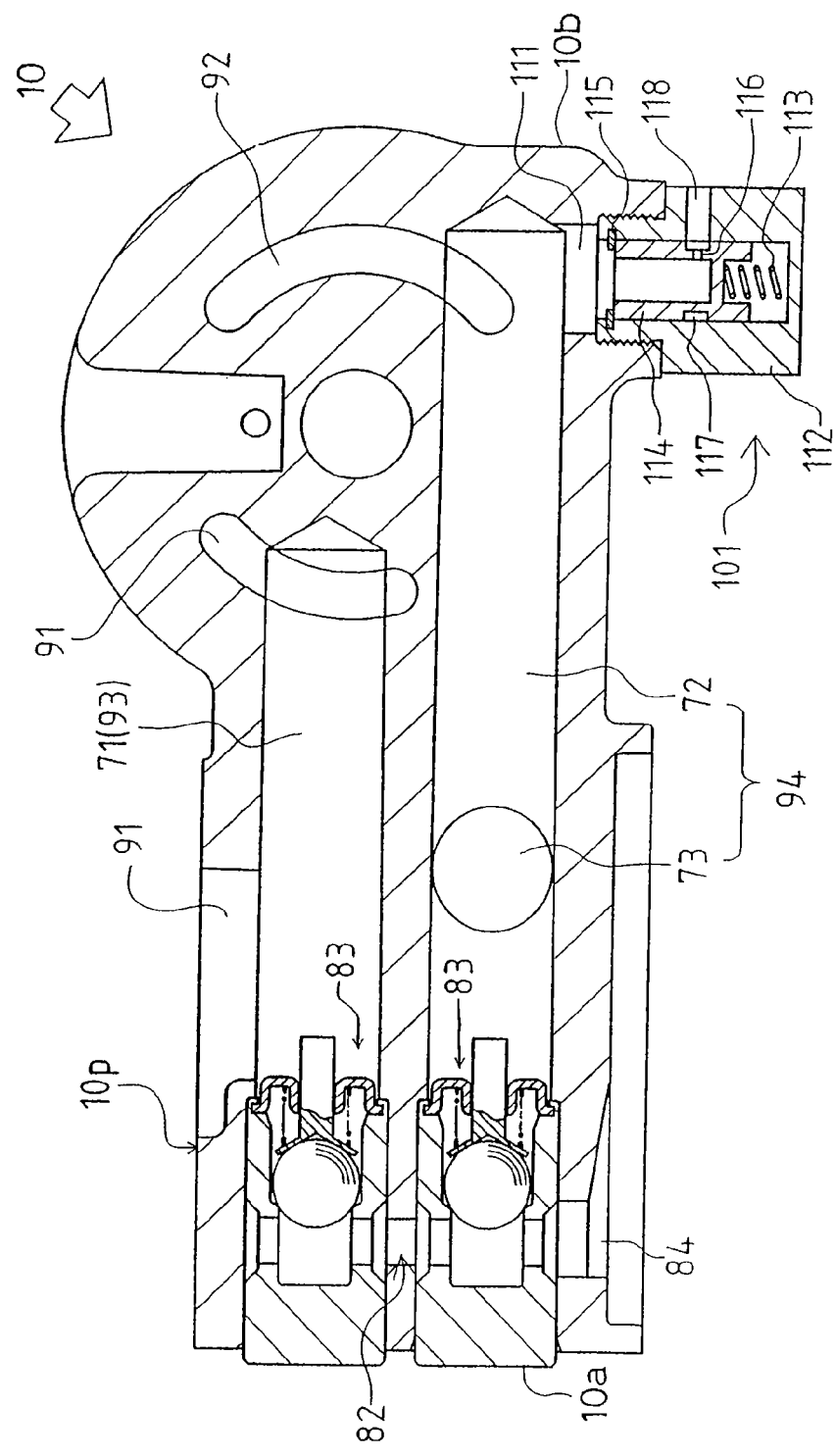
FIG. 6 is an enlarged sectional view of a center section 10 to which an oil draining device 101 is fitted according to the present invention.
Figure 7:
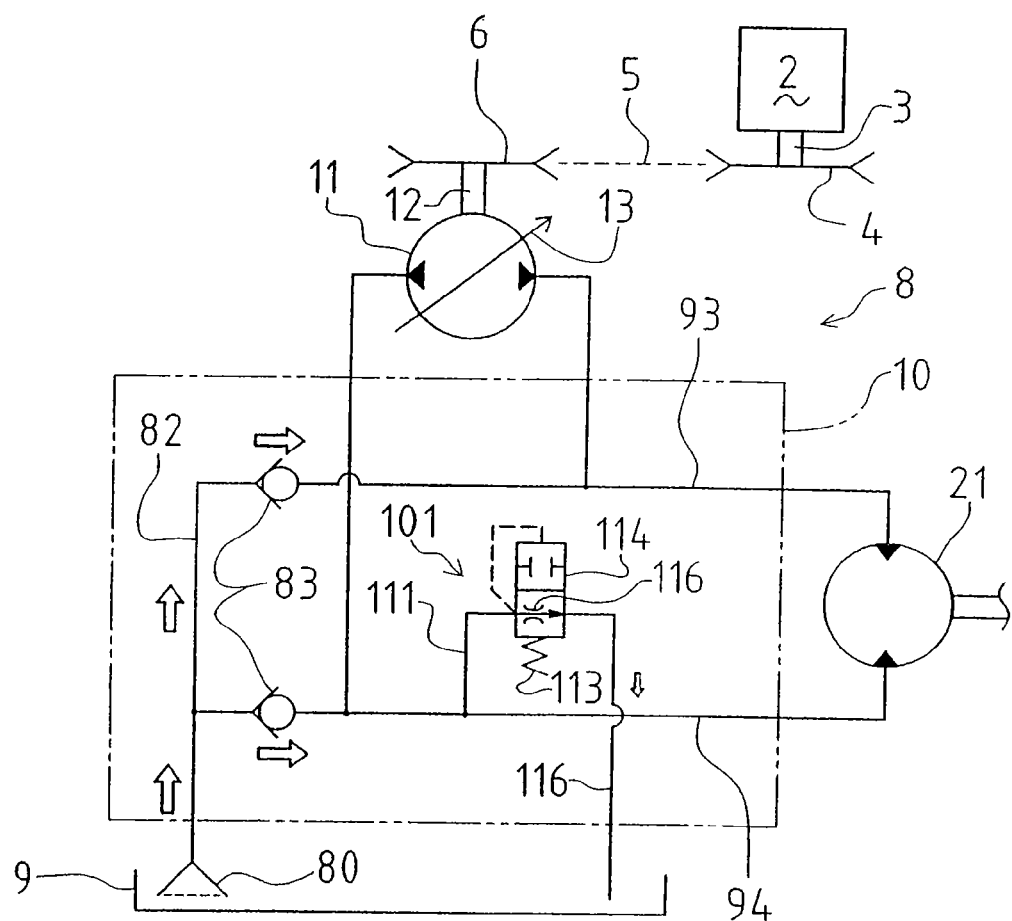
FIG. 7 is a hydraulic circuit diagram including oil draining device 101.

Referring to FIGS. 5, 6 and 7, oil draining device 101 comprises an upwardly opening cylindrical holder 112. Holder 112 is screwed upwardly into center section 10 so as to cover the open bottom end of drain port 111, whereby the interior space of holder 112 communicates with drain port 111. In holder 112 are disposed a vertically slidable valve sleeve 114 and a biasing spring 113. A stopper ring 115 is engaged in holder 112 so as to limit the upward motion of valve sleeve 114.

Valve sleeve 114 is bored by at least one horizontally radial orifice 116 having an extremely small diameter which communicates inside and outside with respect to valve sleeve 114. Valve sleeve 114 is provided along its outer periphery with a loop groove 117 joined to orifice 116. Holder 112 is bored by a radial drain hole 118, which is outwardly open at the outer peripheral surface of holder 112 so as to be brought into communication the oil sump in first chamber R1. The opening of drain hole 118 is horizontally directed toward a downward extension of second side end 10*b* of center section 10 and oppositely to first oil filter 80. The vertical position of drain hole 118 is determined so as to communicate with loop groove 117 of valve sleeve 114 when valve sleeve 114 reaches its upper limit position. Thus, drain port 111, orifice 116, loop groove 117 and drain hole 118 constitutes a drain oil passage.

The upward biasing force of spring 113 is predetermined enough to keep valve sleeve 114 in contact with stopper ring 115 despite a slight increase of hydraulic pressure in second oil passage 94 over its neutral level, thereby holding orifice 116 in communication with drain hole 118 through loop groove 117. Hence, excessive oil in second oil passage 94 is drained to the oil sump in housing 9 through orifice 116, loop groove 117 and drain hole 118, thereby keeping the hydraulic pressure in second oil passage 94 at its neutral level. Therefore, even if, while the manual speed control tool is located at its neutral position, swash plate 13 undergoes a slight slippage from the proper neutral position into its backward traveling range because of inaccurate connection between swash plate 13 and the manual speed control tool, the neutral condition of HST 8 is kept so as to prevent the vehicle from unexpected driving.

Description will now be given on the difference of oil draining system between the conventional type shown in FIG. 1 and the present embodiment shown in FIGS. 6 and 7. Referring to FIG. 1, a drain oil passage having an orifice 116 is disposed adjacent to check valves 83. If the hydraulic pressure in second oil passage 94 becomes slightly higher than its desired neutral level because of inaccurate neutral location of movable swash plate 13 of hydraulic pump 11, heated oil is drained to a charge oil passage 82 through the drain oil passage bypassing one check valve 83, however, the drained oil is likely to be absorbed soon into hydraulically depressed first oil passage 93 through the other check valve 83, thereby increasing the oil temperature in the whole of the closed fluid circuit in center section 10.

On the other hand, referring to the present invention shown in FIGS. 6 and 7, drain hole 118 is disposed apart from charge oil inlet 84 of charge oil passage 82. The excessive oil in second oil passage 94 is drained from drain hole 118 into the oil sump in housing 9, and then, the closed circuit of HST 8 is supplied with oil from the oil sump through first oil filter 80, charge oil inlet 84 and charge oil passage 82, thereby preventing the closed fluid circuit of HST 8 from overheating.

When the manual speed control tool is operated for backward traveling of the vehicle so that hydraulic pump 11 is actuated to increase the hydraulic pressure of second oil passage 94 over the biasing force of spring 113, valve sleeve 114 is made to slide downwardly by the increased hydraulic pressure so as to cut the communication between loop groove 117 and drain hole 118, thereby preventing second oil passage 94 from oil leak. Accordingly, acting HST 8 is prevented from reduction of its voluminal efficiency, thereby keeping its fine reaction to manual speed changing operation.

Figure 8:
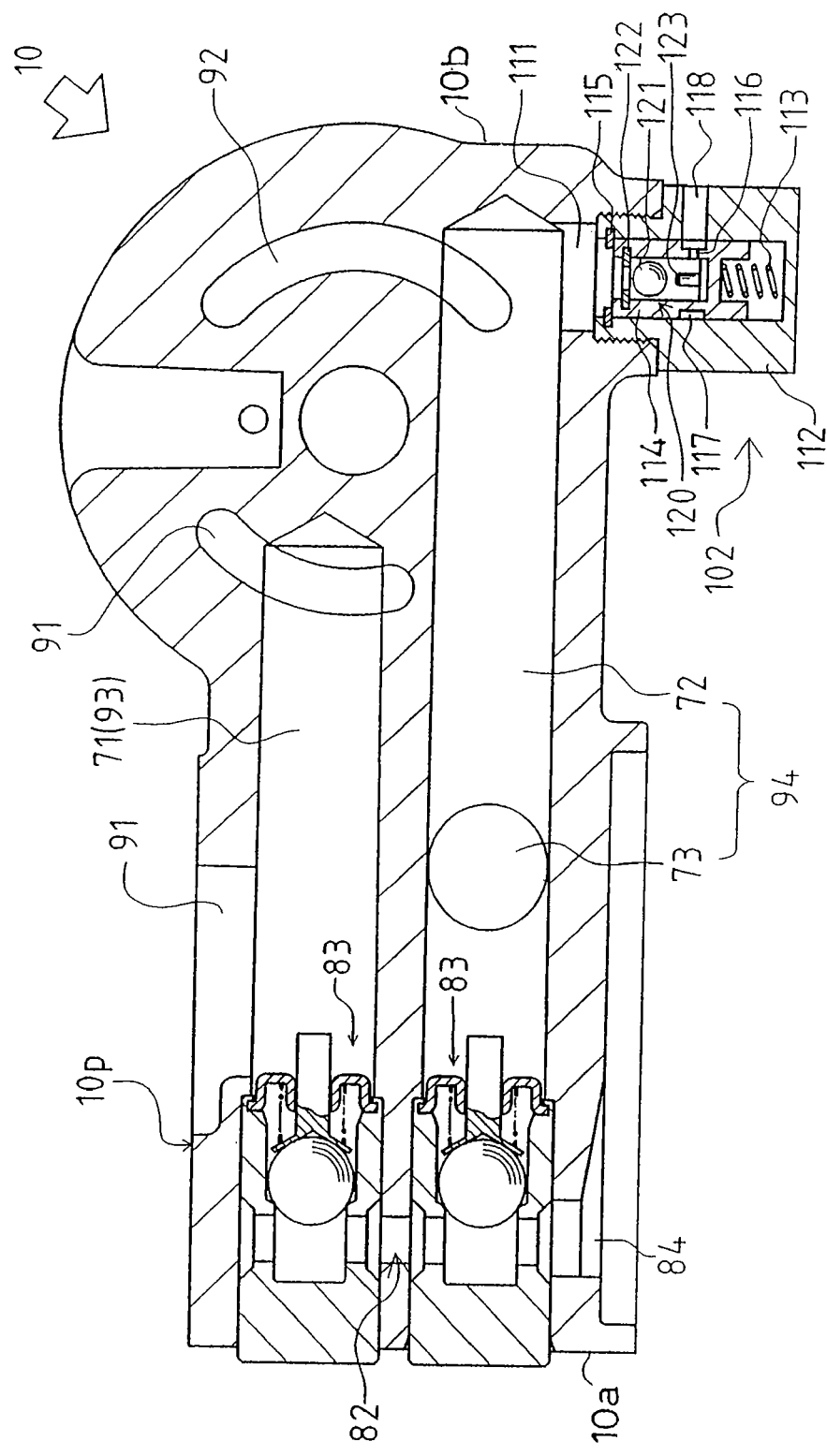
FIG. 8 is an enlarged sectional view of center section 10 to which an alternative oil draining device 102 is fitted according to the present invention.

Referring to FIG. 8, an oil draining device 102 is equal to oil draining device 101 additionally provided with a check valve 120 comprising a ball 121 and a stopper ring 122. Ball 121 is contained in valve sleeve 114. Stopper ring 122 having an inner periphery which is diametrically smaller than ball 121 is fixed onto the inner wall of valve sleeve 114.

If the manual speed control tool is operated for forward traveling of the vehicle, hydraulic pump 11 acts so as to hydraulically depress second oil passage 94. However, second oil passage 94 is not supplied with oil in housing 9 through drain hole 118 and orifice 116 because ball 121 is raised by hydraulic depression of second oil passage 94 so as to close the hole of stopper ring 122. In other words, oil in housing 9 is not directly fed into second oil passage 94 without passing through first oil filter 80, so that obstacles involved in the oil sump of first chamber R1 neither enter the closed fluid circuit of HST 8 nor choke orifice 116.

When the manual speed control tool is located in neutral or operated for backward traveling of the vehicle, ball 121 descends under its own weight into contact with the top of a stopper 123 uprightly provided in valve sleeve 114, thereby making second horizontal oil hole 72 communicate with orifice 116 of valve sleeve 114. Accordingly, in quite the same way with oil draining device 101 of the first embodiment, during the neutral positioning of the manual speed control tool, oil draining device 101 serving as a neutral valve is opened so as to drain oil from second oil passage 94, thereby preventing the vehicle from creeping. During the backward traveling operation, the oil draining passage in oil draining device 102 is closed so as to hold the hydraulic pressure in second oil passage 94, thereby preventing HST 8 in action from reduction of its voluminal efficiency.

Figure 9:
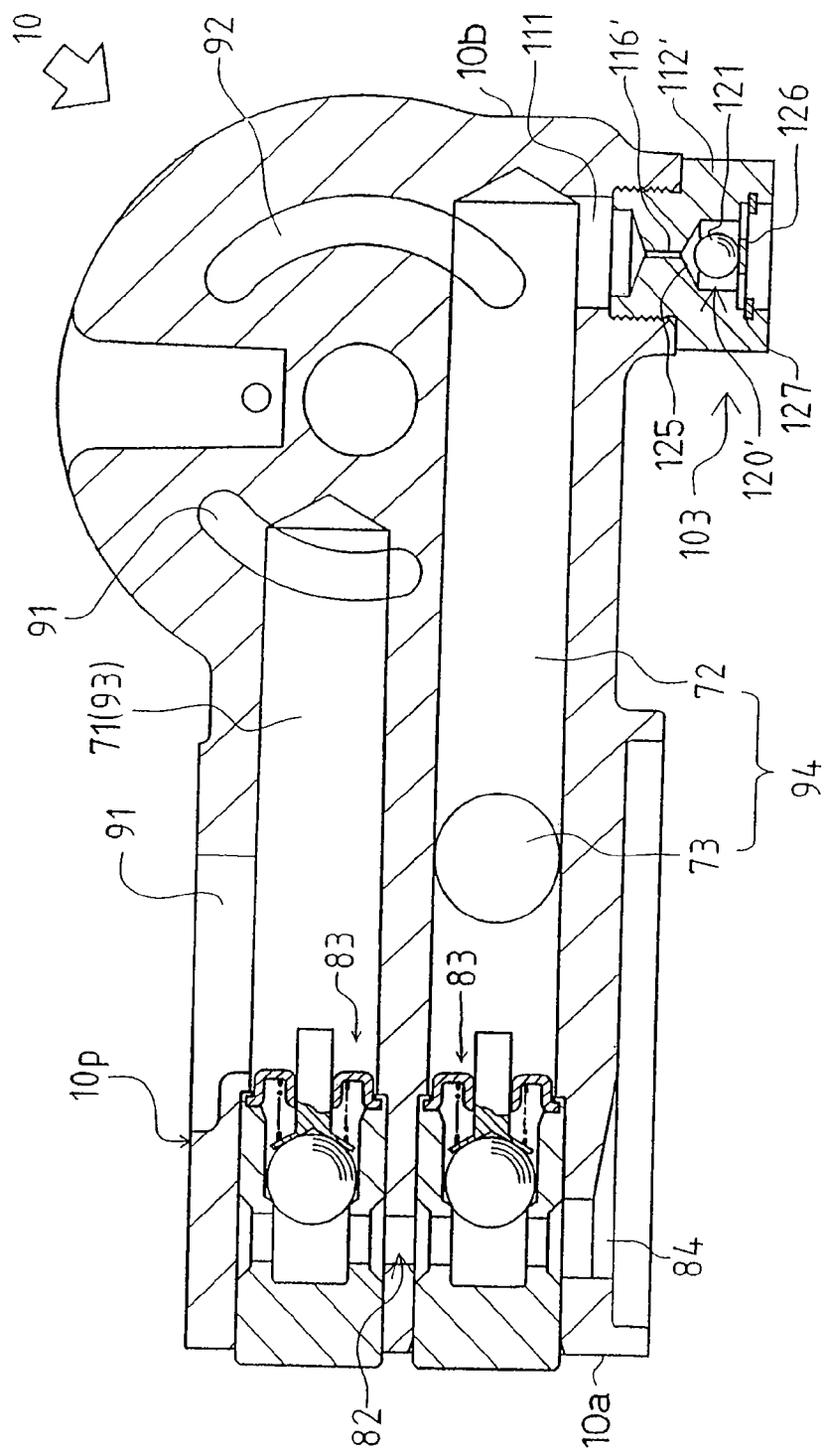
FIG. 9 is an enlarged sectional view of center section 10 to which an alternative oil draining device 103 is fitted according to the present invention.

Referring to an alternative oil draining device 103 shown in FIG. 9, a holder 112' is mounted onto center section 10 adjacent to second side end 10b. Holder 112' is vertically bored through by a hole in connection with drain port 111. An upper portion of the vertical through-hole is radially narrowed so as to serve as an orifice 116'. A lower portion of the same is radially widened so as to serve as a valve chamber 125. Valve chamber 125 is open at its bottom to the oil sump in housing 9. Some members are provided into valve chamber 125, thereby constituting a check valve 120'. A stopper ring 127 is fixedly provided along the peripheral surface of valve chamber 125 in vicinity of its bottom opening. A valve plate 126 is fixedly interposed between stopper ring 127 and holder 112' in valve chamber 125. A ball 121 is vertically movably disposed in valve chamber 125 above valve plate 127. A ceiling of valve chamber 125 is formed in a conical shape, thereby serving as a valve seat for fitting with ball 121.

During the forward driving operation of the manual speed control tool, ball 121 is raised by the hydraulic depression of second oil passage 94 so as to abut against the conical ceiling surface of valve chamber 125, thereby closing orifice 116' so as to prevent second oil passage 94 from the backflow of oil from the oil sump in housing 9, which involves obstacles as a cause of reducing the efficiency of HST 8 and choking orifice 116'. On the other hand, check valve 83 is opened by the hydraulic depression of second oil passage 94 so as to introduce the oil from the oil sump in housing 9 cleaned by first oil filter 80 into second oil passage 94, thereby compensating the oil loss of the closed fluid circuit of HST 8.

Figure 10:
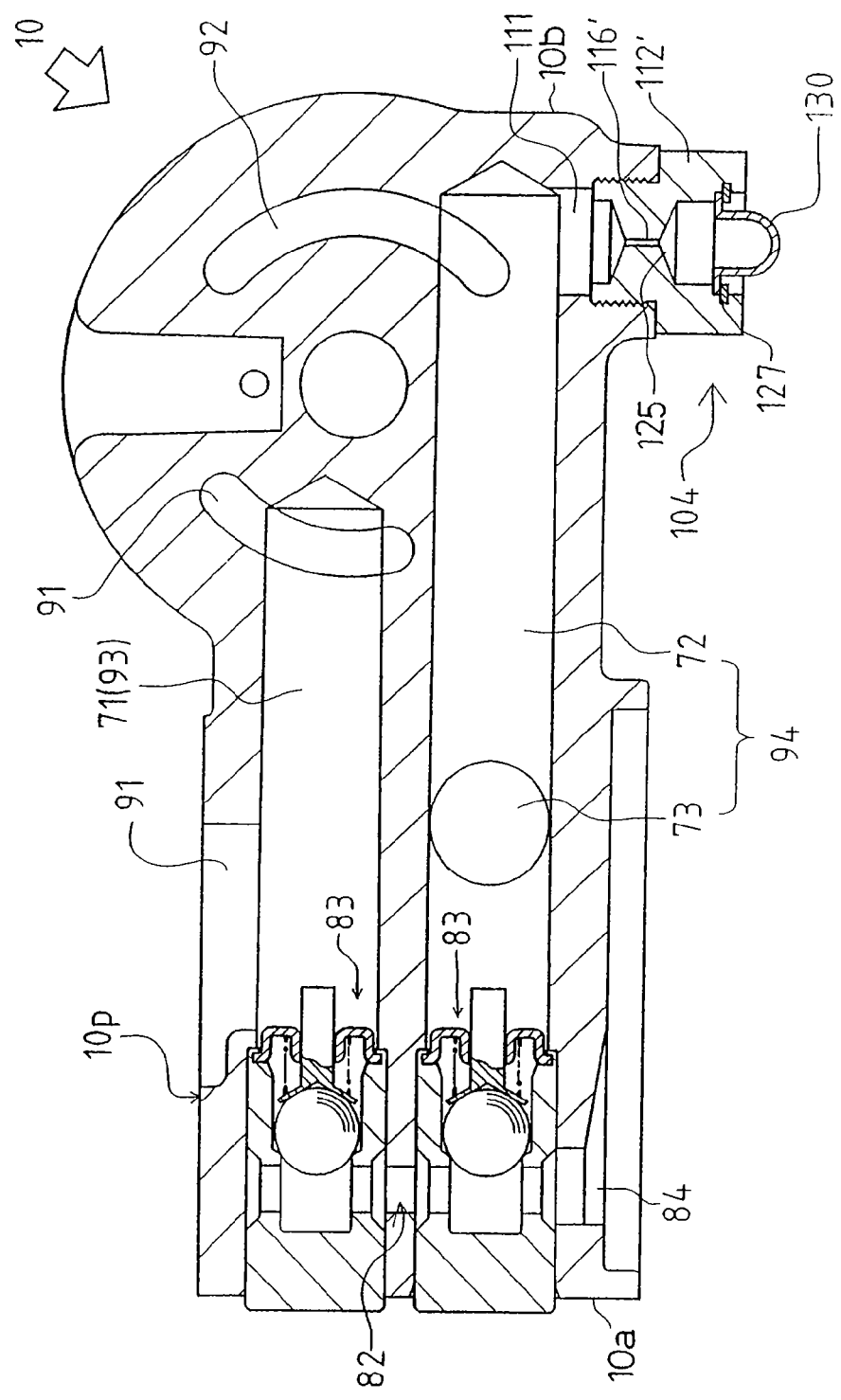
FIG. 10 is an enlarged sectional view of center section 10 to which an alternative oil draining device 104 is fitted according to the present invention.

Referring to an alternative oil draining device 104 shown in FIG. 10, holder 112' provided therein with orifice 116' and valve chamber 125 is identical with that of oil draining device 103, however, check valve 120' is removed and valve plate 126 is replaced with a second oil filter 130.

Due to the removal of check valve 120', during the forward driving operation, the oil of oil sump in housing 9 is also introduced through orifice 116' into hydraulically depressed second oil passage 94 while being cleaned by second oil filter 130, thereby enhancing the oil compensation of the closed fluid circuit of HST 8.

Above-mentioned four oil draining devices 101-104 are classified into two groups: one is provided with a check valve for preventing the backflow of oil into second oil passage 94 hydraulically depressed during forward traveling; and the other is not provided with such a check valve. Oil draining devices 102 and 103 are provided with respective check valves 120 and 120'. Each of oil draining devices 101 and 104 is not provided with a check valve so as to allow oil to backflow from the oil sump in housing 9 into hydraulically depressed second oil passage 94 during the forward traveling operation. Furthermore, oil draining device 104 can filtered the back-flow oil through its second oil filter 130.

In the case of allowing the backflow of oil without a check valve, an oil draining device is preferably provided with an oil filter such as second oil filter 130. However, if the oil draining device is disposed between second oil passage 94 in center section 10 and first oil filter 80, an additional oil filter is unnecessary, thereby reducing the number of parts and the manufacturing costs.

Figure 11:
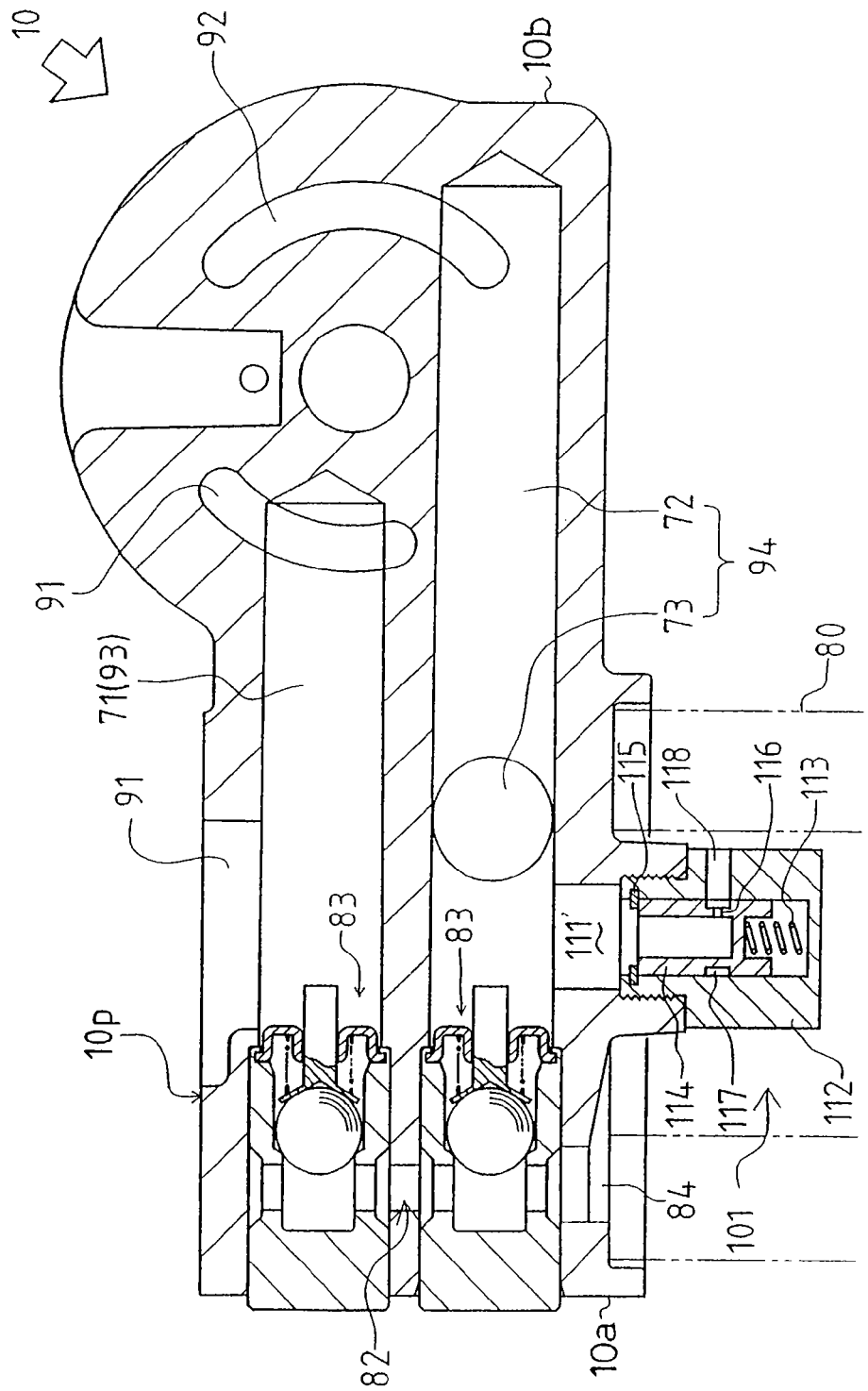
FIG. 11 is an enlarged sectional view of center section 10 to which oil draining device 101 is fitted in a first oil filter 80 according to the present invention.
Figure 12:
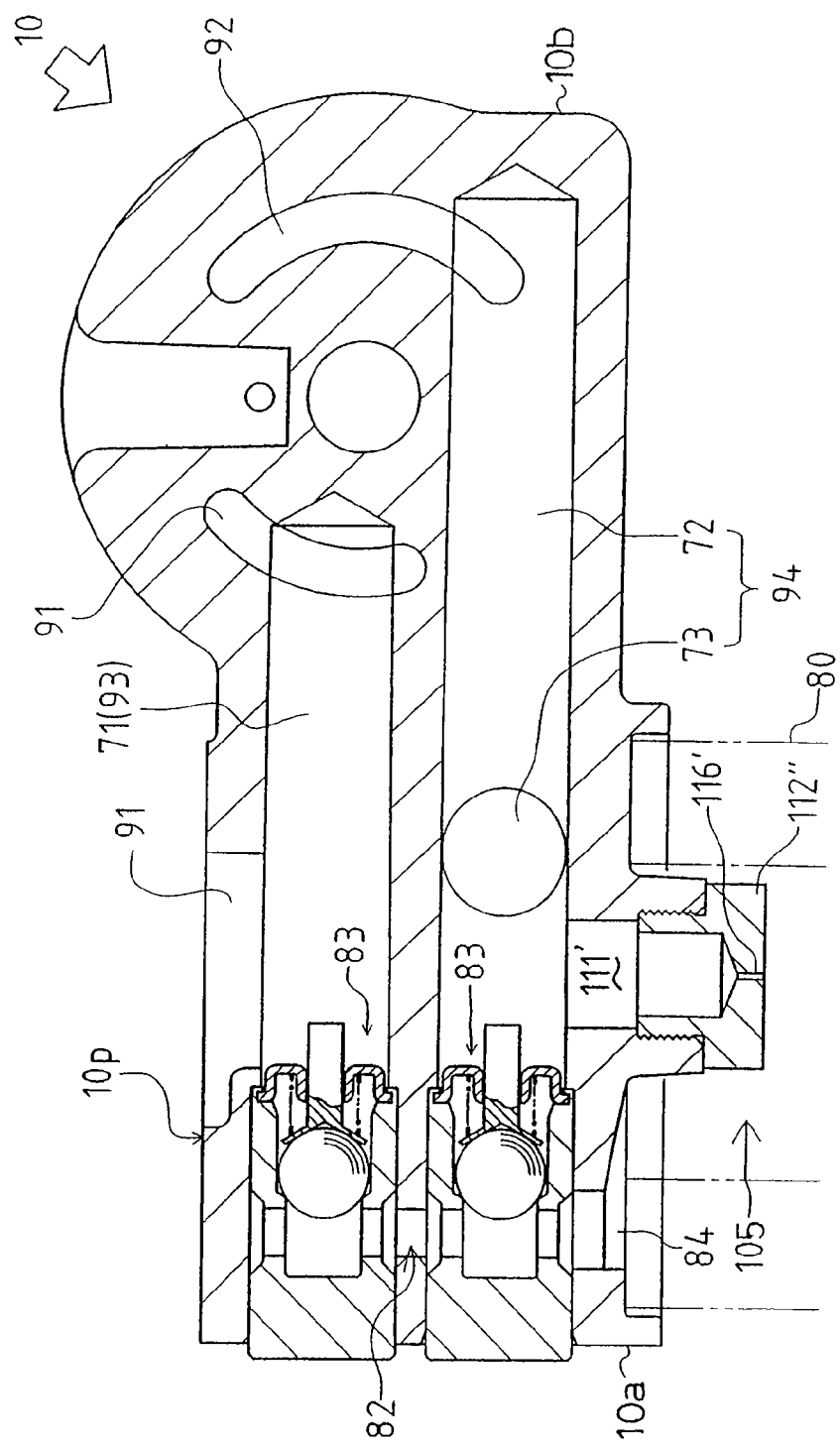
FIG. 12 is an enlarged sectional view of center section 10 to which an alternative oil draining device 105 is fitted in a first oil filter 80 according to the present invention.

Then, as shown in FIGS. 11 and 12, center section 10 may be alternatively provided therein with a drain port 111' which is disposed near charge oil passage 82 so as to be open in cylindrical first oil filter 80 while being spaced from charge oil passage 82 as far as possible.

Referring to FIG. 11, oil draining device 101 is disposed in first oil filter 80 and mounted onto center section 10 so as to communicate with drain port 111'. The opening of drain hole 118 bored in holder 112 is oriented toward the inner surface of first oil filter 80 opposite to charge oil inlet 84, thereby making the oil drained from drain hole 118 into the oil sump in first oil filter 80 as hard as possible to be introduced into charge oil inlet 84.

During the forward traveling of a vehicle, in addition to check valve 83 connected to first horizontal oil hole 71, the drain oil passage formed in oil draining device 101 allows oil to flow therethrough into hydraulically depressed second oil passage 94 while being cleaned by first oil filter 80.

Referring to FIG. 12, an oil draining device 105 is equal to simplified oil draining device 104, from which second oil filter 130 is removed and a portion forming valve chamber 125 therein is cut away, due to first oil filter 80. Oil draining device 105 is constituted by only a holder 112" forming an orifice 116" therein.

While second oil passage 94 is hydraulically pressured higher than its neutral level, orifice 116" allows oil to flow therethrough to the oil sump in first oil filter 80, thereby keeping the neutral condition of HST 8 or serving as a relief valve during the backward traveling of a vehicle. During the forward traveling of a vehicle, in addition to check valve 83 connected to first horizontal oil hole 71, orifice 116" allows oil to flow therethrough into hydraulically depressed second oil passage 94 while being cleaned by first oil filter 80, thereby supplying the closed fluid circuit of HST 8 with operating oil.

Oil draining device 102 provided with check valve 120 or oil draining device 103 provided with check valve 120' may be disposed in first oil filter 80 so as to be connected to drain port 111'.

For expanding the neutral zone of HST 8, any of oil draining devices 101-105 may be alternatively connected to first oil passage 93. In this case, swash plate 13 is allowed to slip slightly from its proper neutral position into its forward traveling range while the manual speed control tool in connection with swash plate 13 is set at its neutral position. Furthermore, both first and second oil passages 93 and 94 may be provided with respective oil draining devices so as to expand a dead zone of swash plate 13 for keeping HST 8 neutral into both its forward and backward ranges.

Figure 13:
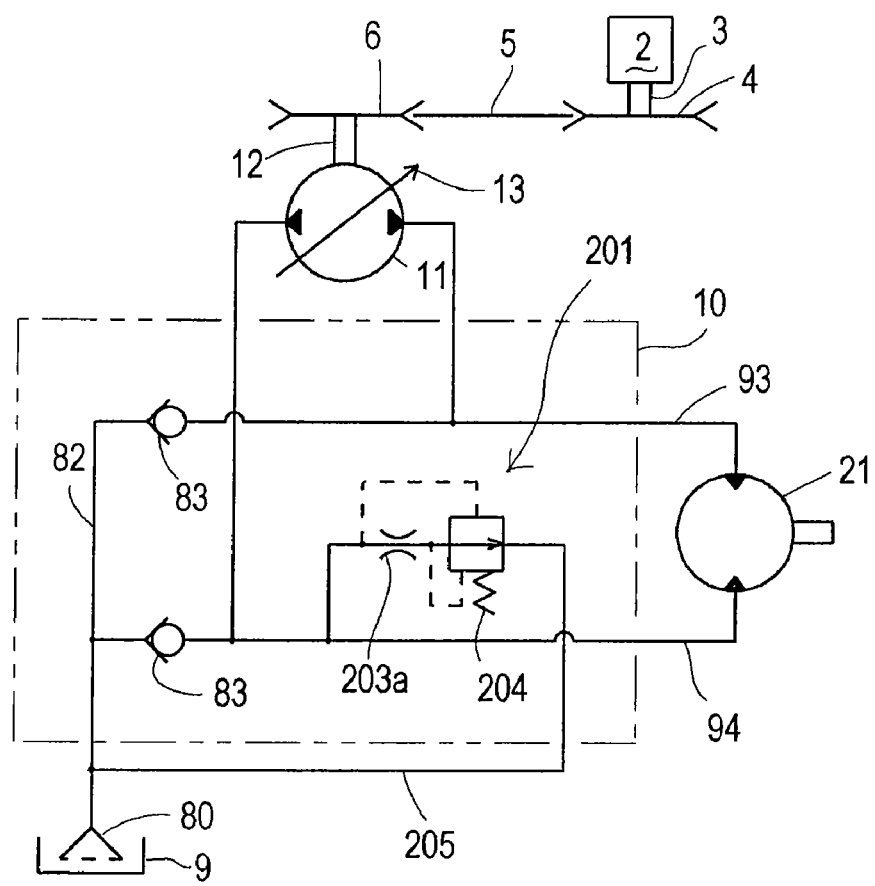
FIG. 13 is a hydraulic circuit diagram including a neutral valve 201 for expanding the neutral dead zone of the HST.
Figure 14:
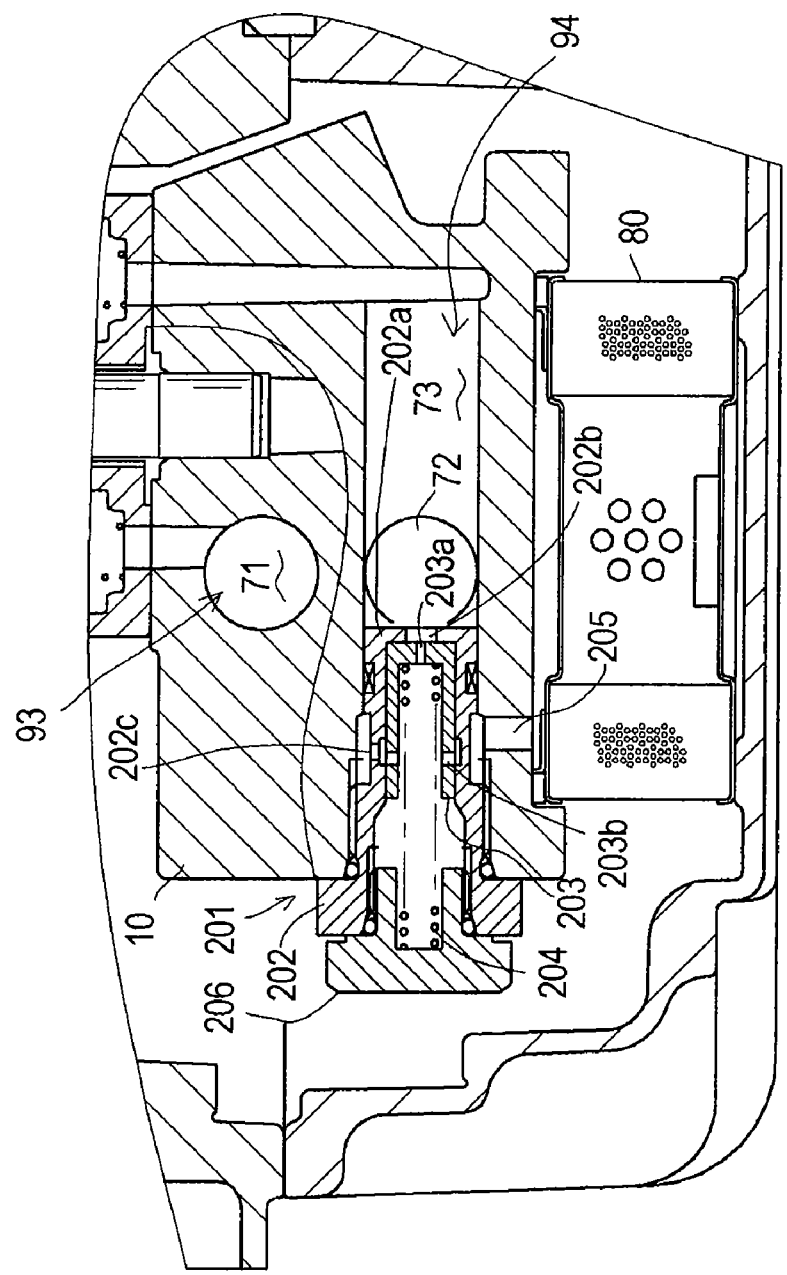
FIG. 14 is an enlarged sectional view of center section 10 including neutral valve 201, when viewed in the axial direction of oil holes 71 and 72.
Figure 15:
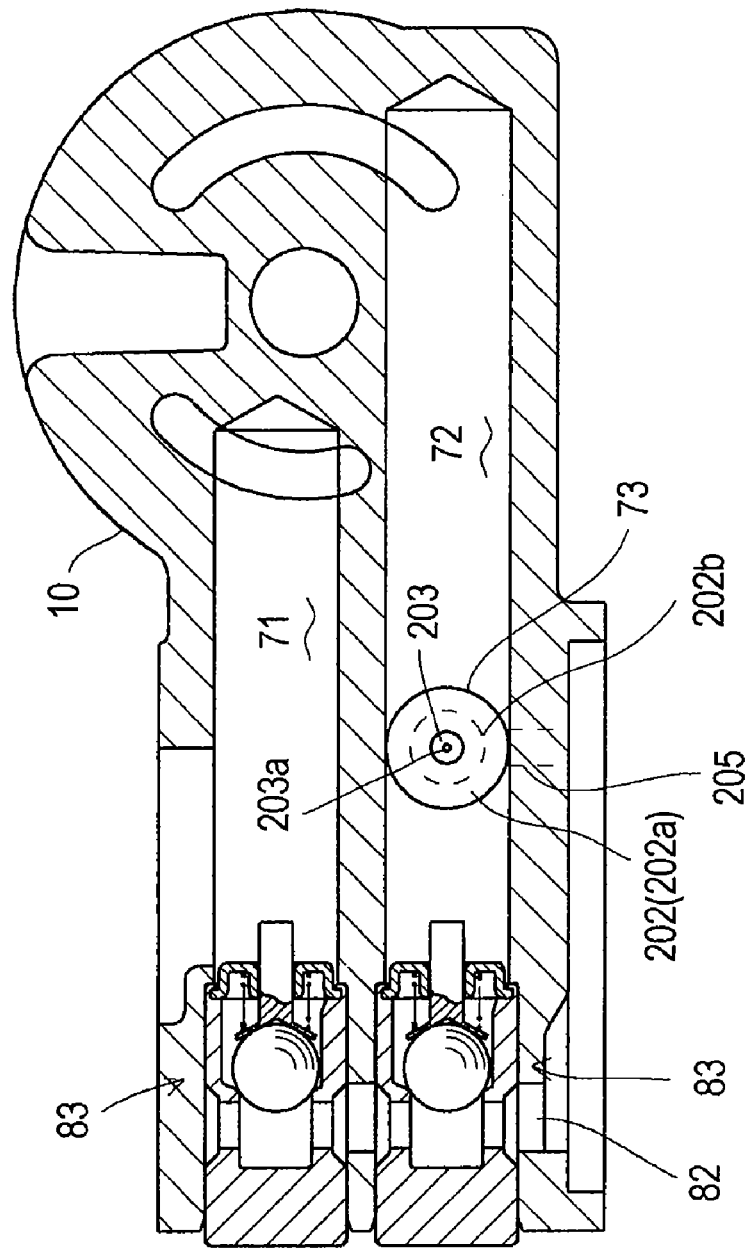
FIG. 15 is an enlarged sectional view of center section 10 including neutral valve 201, when viewed perpendicularly to oil holes 71 and 72.

Referring to FIGS. 13 to 15, a neutral valve 201 comprises a sleeve 202 screwed into oil hole 73 higher-pressurized during backward driving of the vehicle, and a valve body 203 slidably accommodated in sleeve 202. Sleeve 202 includes an axial inward end surface, serving as an end stopper 202a, provided with an opening 202b opened to oil hole 73. Sleeve 202 projects outward center section 10 so as to be axially outwardly opened. The outward opening of sleeve 202 is plugged by a plug 206. Cylindrical valve body 203 includes an axial inward end surface provided with an axial orifice (fixed flow restrictor) 203a opened to oil hole 73 through opening 202b. An adjustment spring 204 is accommodated in sleeve 202 and valve body 203, and pressed at one end thereof against the axial inward end surface of valve body 203, and at the other end thereof against the inside surface of plug 206, thereby pressing the axial inward end surface of valve body 203 against end stopper 202a of sleeve 202. Valve body 203 is bored through by radial ports 203b, and sleeve 202 is bored by a radial port 202c. Center section 10 is bored with a drain port 205 outwardly opened to the oil sump inside oil filter 80. When the axial inward end surface of valve body 203 contacts end stopper 202a of sleeve 202 due to the force of spring 204, ports 203b are opened to drain port 205 through port 202c.

Action of neutral valve 201 will be described. While swash plate 13 of hydraulic pump 11 is disposed at the neutral position or a forward driving position, oil holes 72 and 73 (second oil passage 94) is hydraulically depressed (pressurized lower than first oil passage 93 (oil hole 71)), and in this condition, the axial inward end surface of valve body 203 is pressed against end stopper 202a of sleeve 203 by the force of adjustment spring 204, so as to open neutral valve 201, i.e., connect port 203b to port 202c and drain port 205, thereby opening second oil passage 94 to the oil sump inside oil filter 80. Then, when swash plate 13 is tilted to a backward driving position, high-pressure oil flows through oil holes 72 and 73 (second oil passage 94) having been hydraulically depressed, and simultaneously flows through opened neutral valve 201, i.e., from opening 202b and orifice (fixed flow restrictor) 203a to the oil sump through ports 203b, 202c and 205, thereby draining a specific amount of oil restricted by fixed flow restrictor 203a to the oil sump until the differential pressure between the primary pressure before passing through fixed flow restrictor 203a and the secondary pressure after passing therethrough reaches the pressure corresponding to the force of adjustment spring 204. In this way, due to the oil draining through neutral valve 201 from fixed flow restrictor 203a to the oil sump, a neutral dead zone where hydraulic motor 21 is not driven is expanded into the backward driving zone. The differential pressure increases with an increase of oil flow through oil passage 94. After the differential pressure excesses the pressure corresponding to the force of spring 204, valve body 203 is pushed by the hydraulic pressure in passage 94 against spring 204 and separated from end stopper 202a so as to reduce the opening between port 203b and port 202c of sleeve 202, thereby throttling neutral valve 201, i.e., restricting the flow from passage 94 to drain port 205 opened to the oil sump. Thus, second oil passage 94 is properly pressurized (higher than first oil passage 93) so as to ensure the volumetric efficiency in the HST during the backward driving.

Figure 16:
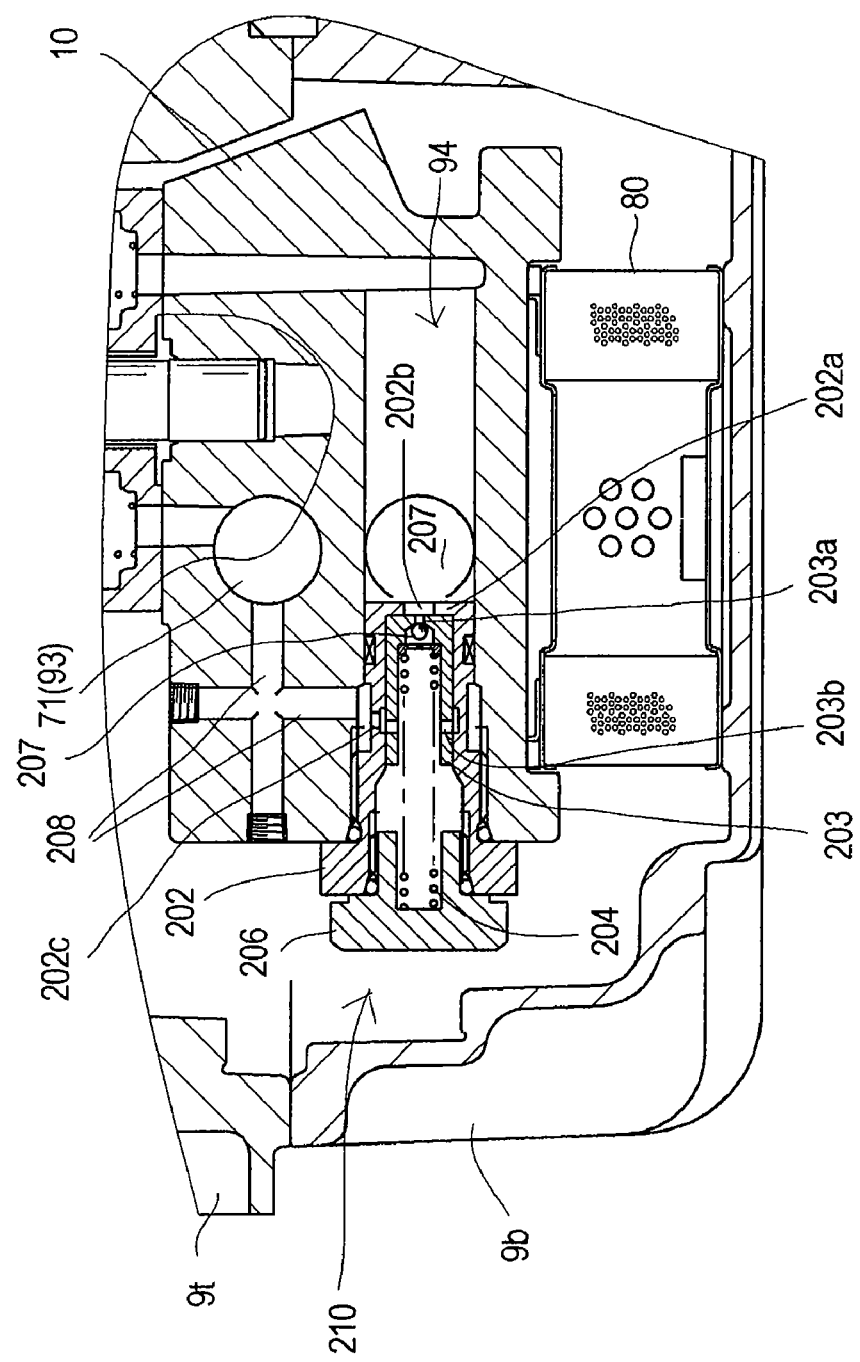
FIG. 16 is an enlarged sectional view of center section 10 including a neutral valve 210, when viewed in the axial direction of oil holes 71 and 72.

Referring to FIG. 16, a neutral valve 210 comprises: sleeve 202 with end stopper 202a, opening 202b and port 202c; valve body 203 with orifice (fixed flow restrictor) 203a and port 203b; adjustment spring 204; and plug 206, similar to neutral valve 102. Neutral valve 210 has two different points from neutral valve 201. The first different point is that center section 10 is formed therein with a bypass passage 208 between port 202c of sleeve 202 and oil hole 71, i.e., first oil passage 93, which is hydraulically depressed during backward driving, instead of drain port 205 opened to the oil sump inside oil filter 80. Therefore, oil released from opened neutral valve 210 flows into oil hole 71, i.e., first oil passage 93 through bypass passage 208, thereby saving required oil to be supplied from the oil sump into the HST circuit in center section 10 through check valves 83. The second different point is that a ball check valve 207 is accommodated in valve body 203 so as to close fixed flow restrictor 203a when the hydraulic pressure in valve body 203 and sleeve 202 is higher than the hydraulic pressure in oil holes 72 and 73. Therefore, when first oil passage 93 is higher-pressurized during forward driving, ball check valve 207 prevents oil leak from first oil passage 93 to second oil passage 94 through fixed flow restrictor 203a.

Figure 17:
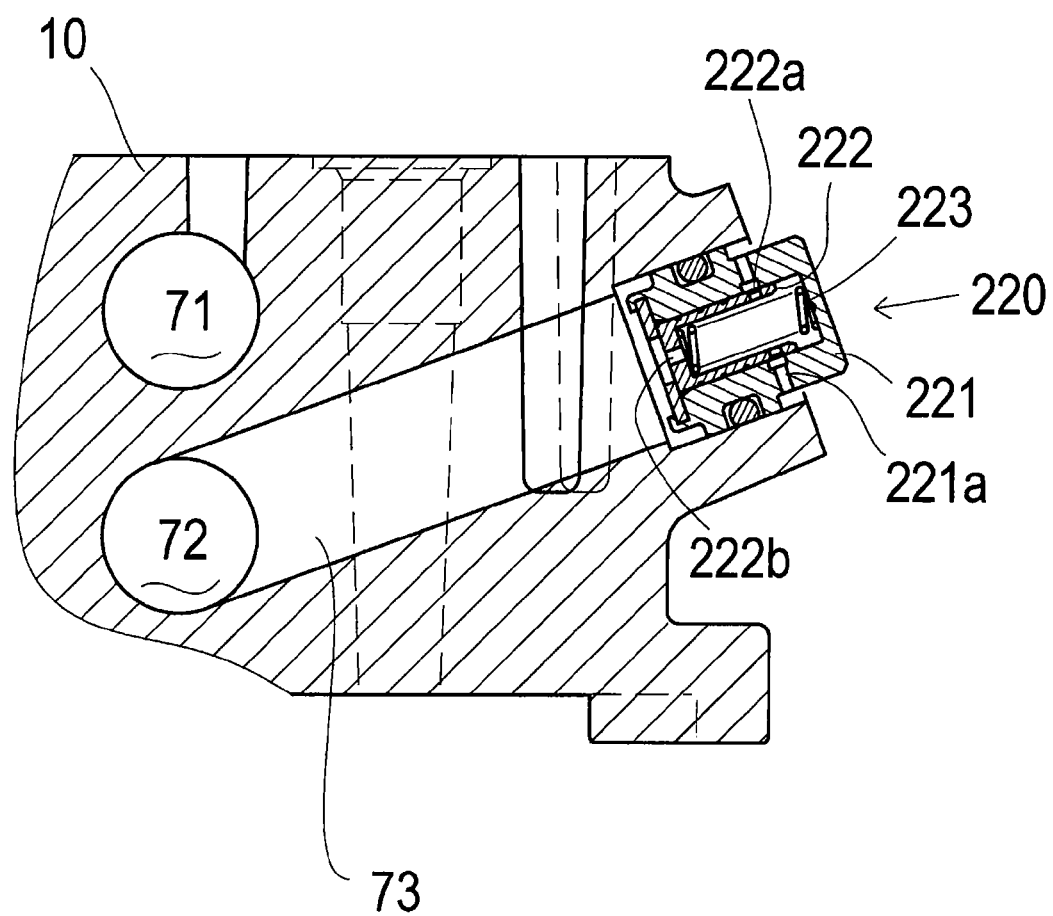
FIG. 17 is an enlarged sectional view of center section 10 including a neutral valve 220 provided in an outward opening of a slanted oil hole 73.

An alternative arrangement of a neutral vale will be described with reference to FIG. 17. As mentioned above, in center section 10, plug 74 is fitted so as to close the outward opened end of vertically slanted oil hole 73 of second oil passage 94, as shown in FIG. 4. In the present embodiment of FIG. 17, a neutral valve 220 replaces plug 74 so as to be fitted into the outward opened end of vertically slanted oil hole 73.

Neutral valve 220 is a continuous flow escape valve. In this regard, neutral valve 220 includes a fixed outer valve body 221, a movable inner valve member 222, and a spring 223. Fixed outer valve body 221 is fixedly and fluid-tightly fitted into the opened end of oil hole 73. Fixed outer valve body 221 has ports 221a constantly opened to the oil sump in housing 9. Cylindrical movable inner valve member 222 is fitted into fixed outer valve body 221 so as to be slidable in the vertically slanted axial direction of oil hole 93. Movable inner valve member 222 has radial ports 222a and an axial port 222b. Port 222b is constantly opened into oil hole 73 and has a fixed area opened to oil hole 73. Ports 222a are constantly opened to respective ports 221a of fixed outer valve body 221. Ports 222a have variable areas opened to ports 221a depending on the slide of movable inner valve member 222 in fixed outer valve body 221. Spring 223 is fitted into fixed outer valve body 221 and movable inner valve member 222 so as to bias movable inner valve member 222 in the direction for maximizing the areas of ports 222a opened to ports 221a against hydraulic pressure in oil hole 73, i.e., second oil passage 94.

Due to this structure, second oil passage 94 including oil hole 73 is constantly opened to the oil sump in housing 9 through neutral valve 220. Even if the hydraulic pressure in second oil passage 94 is increased during backward travel of the vehicle, the maximum areas of ports 222a to ports 221a are kept unless the differential pressure between second oil passage 94 and the oil sump in housing 9 reaches a predetermined value, thereby efficiently realizing the neutral state of the HST. Once the hydraulic pressure in second oil passage 94 rises to have a differential pressure exceeding the predetermined value, movable inner valve member 222 is pushed by the pressure in oil hole 73 against spring 223 so as to throttle the areas of ports 222a opened to ports 221a, i.e., to reduce the oil leak from second oil passage 94 to the oil sump in housing 9, thereby enhancing the power transmission efficiency of the HST.

Figure 18:
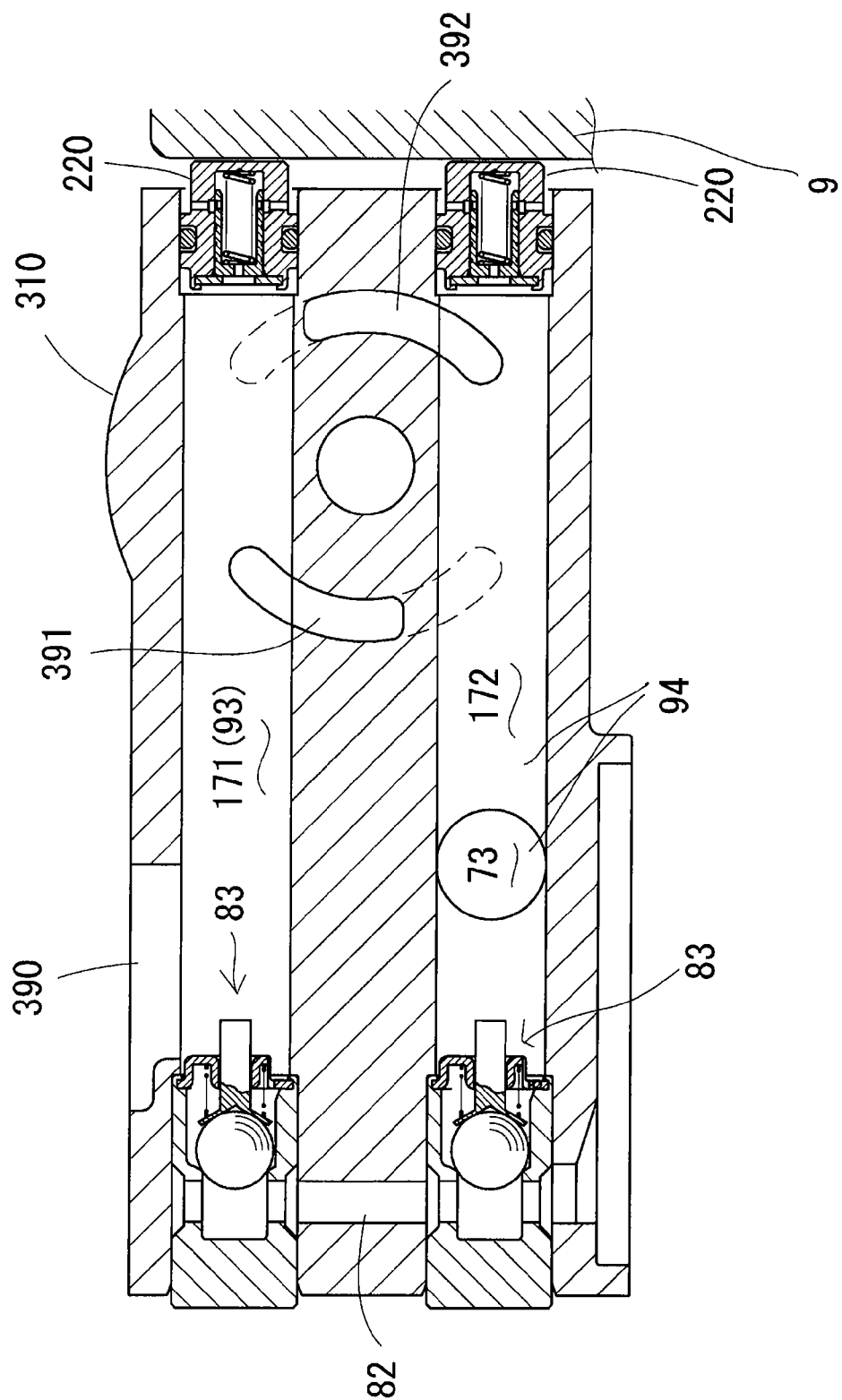
FIG. 18 is an enlarged sectional view of an alternative center section 310 bored with alternative horizontal penetrating oil holes 171 and 172 provided with a pair of charge check valves 83 and a pair of neutral valves 220 opposite to charge check valves 83.

Referring to FIG. 18, an alternative center section 310 with neutral vales 220 will be described. Similar to center section 10, center section 310 has a horizontal upper surface serving as a pump mounting surface for mounting hydraulic pump 11, and a vertical side surface serving as a motor mounting surface for mounting hydraulic motor 21. A kidney port 390 and another kidney port (not shown) are opened at the pump mounting surface. A pair of kidney ports 391 and 392 are opened at the motor mounting surface. An upper horizontal straight oil hole 171 is bored in center section 310 and interposed between kidney ports 390 and 391 so as to serve as first oil passage 93. A lower horizontal straight oil hole 172 is bored in center section 310 and connected to kidney port 392. Vertically slanted oil hole 73 is bored in center section 310 so as to be connected to the other unshown kidney port opened at the pump mounting surface, and to be connected to an intermediate portion of lower horizontal straight oil hole 172. In this way, oil holes 172 and 73 constitute second oil passage 94.

Similar to oil holes 71 and 72 as shown in FIGS. 5, 6 and 8 to 12, oil holes 171 and 172 have respective ends opened outward from center section 310 on the same side surface (hereinafter, referred to as a first side surface) of center section 310 near the pump mounting surface, and oil holes 171 and 172 are fitted therein with respective charge check valves 83 at the respective outward opened ends. The different point of oil holes 171 and 172 from oil holes 71 and 72 is that each of oil holes 171 and 172 also has an end opened outward from center section 310 on the opposite side surface (hereinafter, referred to as a second side surface) of center section 310 near the motor mounting surface. In other words, each of oil holes 171 and 172 penetrates center section 310 so as to have opposite ends opened outward from center section 310.

While charge check valves 83 are fitted in the opened ends of respective oil holes 171 and 172 on the first side surface of center section 310, a neutral valve is fitted into the outward opened end of at least one of oil holes 171 and 172 on the second side surface. Preferably, this neutral valve is continuous flow escape valve type neutral valve 220 having the above-mentioned structure and effect. In the embodiment shown in FIG. 18, neutral valves 220 are fitted into respective oil holes 171 and 172. To support neutral valves 220, outer ends of fixed outer valve bodies 221 of neutral valves 220 contact an inner side surface of housing 9. The pair of neutral valves 220 are preferred for realizing a wide neutral zone expanded into both the zone essentially provided for forward traveling and the zone essentially provided for backward traveling. Alternatively, if only one neutral valve is enough to meet the requirement, on the second side surface of center section 310, neutral valve 220 may be fitted into the opened end of one of oil holes 171 and 172, and the opened end of the other of oil holes 171 and 172 may be plugged with plug 74, for instance.

It is further understood by those skilled in the art that the foregoing description is a preferred embodiment of the disclosed device and that various changes and modifications may be made in the invention without departing from the spirit and scope thereof.

What is claimed is:

1. A hydraulic transmission comprising:
   (a) a housing, an interior space of said housing serving as an oil sump;
   (b) a hydraulic pump disposed in said housing;
   (c) a hydraulic motor disposed in said housing;
   (d) a center section disposed in said housing, wherein said hydraulic pump and said hydraulic motor are mounted onto said center section;
   (e) a closed fluid circuit formed in said center section so as to fluidly connect said hydraulic pump to said hydraulic motor, wherein said closed fluid circuit includes a vertically slanted oil hole having an outward opened end; and
   a neutral valve fitted into said opened end of said vertically slanted oil hole.

2. The hydraulic transmission according to claim 1, wherein said neutral valve is a continuous flow escape valve.

3. A hydraulic transmission comprising:
   (a) a housing, an interior space of said housing serving as an oil sump;
   (b) a hydraulic pump disposed in said housing;
   (c) a hydraulic motor disposed in said housing;
   (d) a center section disposed in said housing, wherein said hydraulic pump and said hydraulic motor are mounted onto said center section;
   (e) first and second kidney ports formed in said center section and opened to said hydraulic pump;
   (f) third and fourth kidney ports formed in said center section and opened to said hydraulic motor;
   (g) a first fluid passage formed in said center section and interposed between said first and third kidney ports, wherein said first fluid passage has opposite ends opened outward from said center section;
   (h) a second fluid passage formed in said center section and interposed between said second and fourth kidney ports, wherein said second fluid passage has opposite ends opened outward from said center section;
   (i) a pair of charge check valves each of which is fitted into one opened end of each of said first and second fluid passages; and
   (j) a neutral valve provided in said center section so as to be fitted into the other opened end of at least one of said first and second fluid passages, wherein said neutral valve is a continuous flow escape valve which constantly opens said at least one of said first and second fluid passages to said oil sump.

4. A hydraulic transmission comprising:
   (a) a housing, an interior space of said housing serving as an oil sump;
   (b) a hydraulic pump disposed in said oil sump;
   (c) a hydraulic motor disposed in said oil sump;
   (d) a center section disposed in said oil sump, wherein said hydraulic pump and said hydraulic motor are mounted onto said center section;
   (e) a closed fluid circuit formed in said center section so as to fluidly connect said hydraulic pump to said hydraulic motor, wherein said closed fluid circuit has an oil hole extended in an axial direction thereof, and wherein said oil hole has an outer end portion opened to said oil sump outside of said center section, and has an inner portion inside of said center section and inward from said outer end portion thereof; and
   (f) a continuous flow escape valve, serving as a neutral valve, provided in said center section so as to fluidly connect said closed fluid circuit to said oil sump, wherein said continuous flow escape valve is interposed between said outer end portion of said oil hole and said inner portion of said oil hole, and wherein said continuous flow escape valve includes:
- (f-1) a cylindrical outer valve body fitted into said oil hole and fixed to said center section, wherein said outer valve body has a first orifice which is opened at one end thereof to said outer end portion of said oil hole, and wherein said outer valve body has an opening facing said inner portion of said oil hole;
- (f-2) a cylindrical inner valve member fitted in said outer valve body movably in said axial direction of said oil hole, wherein an inner space of said inner valve member is constantly opened to said inner portion of said oil hole through said opening of said outer valve body, wherein said inner valve member has a second orifice, which is opened at one end thereof to said inner space of said inner valve member and is adapted to be opened at the other end thereof to another end of said first orifice, and wherein said inner valve member has a third orifice for constantly opening said inner space of said inner valve member to said inner portion of said oil hole through said opening of said outer valve body; and
- (f-3) a spring interposed between said outer valve body and said inner valve member, wherein said spring biases said inner valve member to initially fully open said second orifice to said first orifice so as to allow flow of oil between said inner space of said inner valve member and said outer end portion of said oil hole, and wherein an opening area of said second orifice to said first orifice is gradually reduced in proportion to increase of a hydraulic pressure of oil in said oil hole pushing said inner valve member against said spring.

5. The hydraulic transmission according to claim 4, wherein said first and second orifices are extended in a radial direction of said oil hole.

6. The hydraulic transmission according to claim 4, wherein said first and second orifices are extended in a radial direction of said oil hole, and wherein said third orifice is extended in said axial direction of said oil hole.

7. The hydraulic transmission according to claim 4, wherein said axial direction of said oil hole is slanted from a horizontal direction.

8. The hydraulic transmission according to claim 4, wherein said third orifice is extended in said axial direction of said oil hole.

* * * * *

UNITED STATES PATENT AND TRADEMARK OFFICE
CERTIFICATE OF CORRECTION

| | | |
|---|---|---|
| PATENT NO. | : 7,971,435 B2 | Page 1 of 1 |
| APPLICATION NO. | : 11/735398 | |
| DATED | : July 5, 2011 | |
| INVENTOR(S) | : Sumomozawa et al. | |

It is certified that error appears in the above-identified patent and that said Letters Patent is hereby corrected as shown below:

In column 14, line 15, claim 1, replace "a neutral valve" with --(f) a neutral valve--.

Signed and Sealed this
Eighteenth Day of October, 2011

David J. Kappos
*Director of the United States Patent and Trademark Office*